US008439745B2

(12) United States Patent
Lind et al.

(10) Patent No.: US 8,439,745 B2

(45) Date of Patent: May 14, 2013

(54) ELECTRONIC SWEEPSTAKES SYSTEM PROVIDING MULTIPLE GAME PRESENTATIONS FOR REVEALING RESULTS FROM A SINGLE SWEEPSTAKES GAME

(75) Inventors: Clifton E. Lind, Austin, TX (US); Jefferson C. Lind, Austin, TX (US); Brian A. Watkins, Austin, TX (US); Eric W. Brown, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 39 days.

(21) Appl. No.: 12/972,487

(22) Filed: Dec. 19, 2010

(65) Prior Publication Data

US 2011/0105214 A1 May 5, 2011

Related U.S. Application Data

(63) Continuation of application No. 11/365,058, filed on Mar. 1, 2006, now Pat. No. 7,878, 900.

(60) Provisional application No. 60/750,144, filed on Dec. 14, 2005.

(51) Int. Cl.

*A63F 9/24* (2006.01)
*A63F 13/00* (2006.01)
*G06F 17/00* (2006.01)
*G06F 19/00* (2011.01)

(52) U.S. Cl.

USPC .................. 463/25; 463/17; 463/40; 463/42; 703/12; 703/14

(58) Field of Classification Search .................... 463/17, 463/25, 40, 42; 703/14.12

See application file for complete search history.

(56) References Cited

U.S. PATENT DOCUMENTS 4,669,730 A 6/1987 Small
4,953,895 A 9/1990 Goussios (Continued)

FOREIGN PATENT DOCUMENTS

GB 2316910 A 3/1998
JP 2002-293065 10/2002

(Continued)

OTHER PUBLICATIONS

International Search Report for PCT/US2006/61365 dated Sep. 26, 2007 (3 Pages).

(Continued)

*Primary Examiner* — Omkar Deodhar
*Assistant Examiner* — Adetokunbo O Torimiro
(74) *Attorney, Agent, or Firm* — Russell D. Culbertson, Esq.; JP Cody, Esq.

(57) ABSTRACT

A system, apparatus, and method are disclosed wherein a reveal request is initiated through a result reveal station by a person (user) who has previously made some purchase or donation and has been assigned one or more sweepstakes entries in an assignment order from a set of available sweepstakes entries for a sweepstakes game. This reveal request represents a request to reveal one or more of the results associated with the corresponding sweepstakes entries that have been assigned to the user. The reveal station employs a game presentation including various graphics and audio effects to show sweepstakes results in an entertaining fashion. In response to the reveal request, or perhaps even prior to the reveal request, one or more sweepstakes entries are selected to be revealed for the reveal request. The sweepstakes entries are selected in an order different from the order in which the sweepstakes entries were assigned to the user. The selection of entries is based on a set of game characteristics associated with the game presentation provided at the reveal station through which the reveal request is initiated.

19 Claims, 10 Drawing Sheets

U.S. PATENT DOCUMENTS

| | | | |
|---|---|---|---|
| 4,962,950 | A | 10/1990 | Champion |
| 5,324,035 | A | 6/1994 | Morris et al. |
| 5,504,808 | A | 4/1996 | Hamrick, Jr. |
| 5,513,102 | A | 4/1996 | Auriemma |
| 5,749,075 | A | 5/1998 | Toader et al. |
| 5,987,101 | A | 11/1999 | Rathore et al. |
| 6,024,640 | A | 2/2000 | Walker et al. |
| 6,028,920 | A | 2/2000 | Carson |
| 6,056,289 | A | 5/2000 | Clapper, Jr. |
| 6,134,309 | A | 10/2000 | Carson |
| 6,327,351 | B1 | 12/2001 | Walker et al. |
| 6,413,161 | B1 | 7/2002 | Baerlocher et al. |
| 6,722,977 | B1 | 4/2004 | Heflin |
| 6,899,622 | B2 * | 5/2005 | Lind et al. ........................ 463/17 |
| 6,907,400 | B1 * | 6/2005 | Matsko et al. ............. 705/14.12 |
| 2002/0028708 | A1 | 3/2002 | Busch et al. |
| 2002/0046255 | A1 | 4/2002 | Moore et al. |
| 2003/0134672 | A1 | 7/2003 | Fulton |
| 2003/0144052 | A1 | 7/2003 | Walker et al. |
| 2005/0021400 | A1 | 1/2005 | Postrel |
| 2005/0091108 | A1 | 4/2005 | Frost |
| 2005/0096135 | A1 | 5/2005 | Houchin |
| 2005/0250572 | A1 | 11/2005 | Kane et al. |
| 2006/0047573 | A1 | 3/2006 | Mitchell et al. |
| 2006/0068898 | A1 * | 3/2006 | Maya .............................. 463/25 |

FOREIGN PATENT DOCUMENTS

| | | |
|---|---|---|
| JP | 2004-303183 | 10/2004 |
| WO | WO 99/34311 A1 | 7/1999 |
| WO | WO 01/26001 A1 | 4/2001 |

OTHER PUBLICATIONS

Written Opinion of the International Search Authority (PCT Rule 43bis.1) for PCT/US2006/61365 dated Sep. 26, 2007 (5 Pages).

Extended European Search Report for European Patent Application No. 06840067.0 dated Jul. 9, 2010 (7 Pages).

* cited by examiner

ELECTRONIC SWEEPSTAKES SYSTEM PROVIDING MULTIPLE GAME PRESENTATIONS FOR REVEALING RESULTS FROM A SINGLE SWEEPSTAKES GAME

CROSS-REFERENCE TO RELATED APPLICATIONS

This application is a continuation of co-pending U.S. patent application Ser. No. 11/365,058, filed Mar. 1, 2006, which claims the benefit, under 35 U.S.C. §119(e), of U.S. Provisional Patent Application No. 60/750,144, filed Dec. 14, 2005, entitled "Electronic Sweepstakes System Providing Multiple Game Presentations for Revealing Results from a Single Sweepstakes Game." The Applicants claim the benefit of this provisional patent application pursuant to 35 U.S.C. §119(e). The entire content of these applications are incorporated herein by this reference.

This application is related to U.S. patent application Ser. No. 11/201,487, entitled "Electronic Sweepstakes Entry Distribution System," filed Aug. 11, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights of copyright whatsoever.

BACKGROUND OF THE INVENTION

1. Field of the Invention

The present invention relates to electronic sweepstakes systems. More particularly, the invention relates to an electronic sweepstakes system which provides sweepstakes players the ability to reveal their sweepstakes results in a number of entertaining formats. The invention includes a method for revealing sweepstakes entry results, and also includes a sweepstakes system and program product.

2. Description of the Related Art

Sweepstakes games are commonly used to promote the sale of various products or to encourage charitable donations. Generally, a sweepstakes game entry, or some fixed number of entries, are given to a purchaser of a sweepstakes qualifying product or to a donor in return for a charitable donation. The purchaser/donor/sweepstakes player may then redeem winning sweepstakes entries for the identified prizes. Sweepstakes prizes may be cash prizes, store credit prizes, or merchandise prizes for example. Commonly, the rules for a given sweepstakes game will define a top level or "grand" prize, and a number of other prize levels. A sweepstakes game may offer only one or a very small number of grand prizes, and larger numbers of prizes at one or more lower prize levels.

The results for the various sweepstakes entries may be determined in several different ways. In some sweepstakes games, each entry is associated with a given sweepstakes result before the entry is distributed to a purchaser/donor/player. In other sweepstakes games, each entry is associated with some identifier and a drawing is held to identify winning entries after the sweepstakes entries are distributed to purchasers/donors/players.

In sweepstakes games associated with the sale of products, the sweepstakes entries may be in the form of tickets (which may be referred to alternatively as playing pieces) that are incorporated in some fashion with the product packaging. For example, a cereal box may have a sweepstakes entry ticket printed on the cereal box itself, and the purchaser/sweepstakes player must cut the entry ticket from the box in order to redeem the entry for any associated prize. In another common example, a sweepstakes entry ticket may be printed on the inside surface of a soft drink lid or on an inside surface of a label secured to the soft drink bottle. In either case, the sweepstakes entry ticket may include a code for identification and/or verification purposes and, where the results are preassociated with the sweepstakes entries, an indicator showing the prize associated with the entry.

Other sweepstakes games do not rely on sweepstakes entry tickets incorporated in product packaging. In these sweepstakes games, separate sweepstakes entry tickets are given to the purchaser/donor/sweepstakes player at the time of the purchase/donation. These sweepstakes entry tickets are preprinted and made available to the retailer or charitable organization for distribution to purchasers/donors/players. As with sweepstakes entry tickets incorporated in product packaging, the tickets distributed separately from products include at least a code for identification and/or verification purposes, and may also include an indicator of the prize associated with the ticket when prizes are preassociated with entry tickets. Where the sweepstakes prizes are indicated in the preprinted entry tickets themselves, the prize indicators are preferably obscured in some fashion so that the ticket distributor cannot see the prize associated with a given ticket before the ticket is distributed. An opaque scratch-off material or an opaque peel-off tab or any other suitable arrangement may be used to obscure the prize indicator.

Some governmental regulations relating to sweepstakes games require that sweepstakes entries must be made available to nonpurchasers or nondonors. Thus, the rules for a given sweepstakes game may define an alternate method of entry (AMOE). A common AMOE requires a potential player to submit a postcard or other entry form to some distribution center. The distribution center responds to such a postcard or entry form by returning one or more sweepstakes entry tickets to the postcard/entry form sender.

Related U.S. patent application Ser. No. 11/201,487, entitled "Electronic Sweepstakes Entry Distribution System," discloses a sweepstakes system that assigns sweepstakes entries from a pool of predetermined sweepstakes entries, with each entry being associated with a result in the sweepstakes game. A sweepstakes player may reveal the results associated with their sweepstakes entries at a player station which may show the results in any one of a number of different graphic formats, such as a reel-type gaming machine format, or a card game format.

In sweepstakes games that distribute sweepstakes entries from a predetermined set of sweepstakes entries, the predetermined set of sweepstakes entries places a constraint on the game formats that may be used for revealing the sweepstakes results to the sweepstakes players. In these cases, each game format for revealing the sweepstakes entry results must have play characteristics which match the characteristics of the predetermined set of sweepstakes entries. For example, the prizes available in the result revealing game format must match the prizes available in the sweepstakes game. Also, the prize distribution in the sweepstakes game dictates the prize distribution in the result revealing game format. These constraints on the result revealing game format made it difficult to provide a variety of game formats for revealing the sweepstakes results. In order to provide result revealing game formats with various different play characteristics, it was necessary to have multiple sweepstakes games in play with each sweepstakes game restricted to a corresponding set of result revealing game formats. That is, a sweepstakes player would receive sweepstakes entries from a given sweepstakes game and could then reveal the sweepstakes results only through a result revealing game format corresponding to the given sweepstakes game.

SUMMARY OF THE INVENTION

The present invention provides a sweepstakes game entry selection method in which the sweepstakes results from a given predetermined set of sweepstakes entries may be revealed to the sweepstakes player in any one of a number of exciting and attractive game formats. These multiple game formats are provided through sweepstakes result revealing stations and may have a wide variety of different play characteristics, regardless of the characteristics associated with the given set of sweepstakes entries which make up the sweepstakes game. The invention encompasses methods for selecting sweepstakes entries for the purpose of revealing sweepstakes results to a sweepstakes player, as well as apparatus and program products for selecting sweepstakes entries for revealing sweepstakes results.

The present invention involves the use of a sweepstakes game made up of a number of different sweepstakes entries. Some of the sweepstakes entries included in a given sweepstakes game according to the invention may be associated with some winning result. Other sweepstakes entries included in the given sweepstakes game may not be associated with any winning result, and thus represent losing sweepstakes entries.

One method embodying the principles of the invention includes receiving a reveal request initiated by a person who has previously made some purchase or donation and has been assigned a number of sweepstakes entries from a set of available sweepstakes entries for a sweepstakes game. This person initiating the reveal request will be referred to in this disclosure and the accompanying claims as the "user." The user initiates the reveal request through a sweepstakes result reveal station ("reveal station") that allows the user to see their sweepstakes results, that is, the results associated with the user's sweepstakes entries, in an entertaining fashion. The various graphics and audio effects that may be employed in a reveal station to show sweepstakes results will be referred to in this disclosure and the accompanying claims as a "game presentation." Each game presentation is associated with a set of game characteristics that define one or more characteristics of play in the game presentation. The set of game characteristics may include, for example, overall win frequency, number of prize levels and the prize value at each level, win frequency at each prize level, bonus play schemes, and bonus prizes. The reveal request initiated by the user is correlated to a particular game presentation and associated set of game characteristics provided by the respective reveal station through which the reveal request is initiated.

This form of the invention also includes selecting one or more sweepstakes entries. This selection may or may not be in response to the reveal request. The purpose of this sweepstakes entry selection step is to identify the sweepstakes results to be revealed to the user for the reveal request. According to the present invention, the sweepstakes entries are selected in an order different from the order in which the sweepstakes entries were assigned to the user (the "assignment order"). This order in which previously assigned sweepstakes entries are selected is based at least partially on the set of game characteristics associated with the game presentation with which the reveal request is associated. By selecting sweepstakes entries from the user's previously assigned sweepstakes entries in an order based on the game characteristics of the game presentation associated with the reveal request, the results associated with the user's sweepstakes entries may be revealed to the user in an order that better matches or imitates the play characteristics of the particular game presentation.

In some forms of the invention, the user has the option of initiating their reveal request from any one of a number of different reveal stations offering different game presentations with different play characteristics. To accommodate these different game presentations for revealing sweepstakes results that have been assigned from a single set of sweepstakes entries, the invention may include storing a number of different entry selection processes, each selection process being associated with a particular game presentation and associated set of game characteristics. The process of selecting the sweepstakes entries for a reveal request then includes applying the respective entry selection process associated with the game presentation of the reveal station through which the reveal request is initiated.

Although the sweepstakes entry selection process according to the invention allows a user's sweepstakes results to be revealed in an order that best matches the play characteristics for a given game presentation, the differences between the play characteristics for a given game presentation and a set of results defined by a number of sweepstakes entries may be such that there will be a difference between the results that may be shown through the game presentation and the results for the assigned sweepstakes entries. In this case, the invention includes selecting a close match between one or more sweepstakes entries and a result available in the given game presentation and identifying a remainder. The "close match" in this case means that the one or more sweepstakes entries are together associated with a cumulative result somewhat greater than the result available in the given game presentation. The remainder represents the difference between a cumulative result for one or more sweepstakes entries selected for a given reveal request and a prize presented to the user in the game presentation. The identified remainder may be revealed to the user as a bonus award or some other award either at the time the rest of the result is revealed for the given reveal request or after subsequent reveal requests. A remainder may also be applied to show a result for another reveal request, and a number of different remainders may be pooled together and be displayed as a bonus prize or as part of the result for another reveal request.

Another method according to the present invention includes receiving a reveal request initiated by a user and selecting a number of the sweepstakes entries either in response to the reveal request or in anticipation of the reveal request. These sweepstakes entries are selected from a group of such entries that have previously been assigned to a user account for the user and are each associated with a respective individual entry result. The method further includes identifying a cumulative result for the selected number of sweepstakes entries. This cumulative result is equal to a total of the respective individual entry results for the selected number of sweepstakes entries. The cumulative result for the selected number of sweepstakes entries is revealed as a result responsive to the reveal request. This grouping of multiple sweepstakes entries for arriving at a cumulative result allows greater flexibility in matching the various results that may be associated with different game presentations available for revealing sweepstakes results.

An apparatus according to one preferred embodiment of the present invention includes an assignment controller and a selection controller. These controllers may be embodied in a single data processing system or in different data processing systems. The assignment controller assigns a number of sweepstakes entries in an assignment order to a user account, each assigned sweepstakes entry being associated with a result in a sweepstakes game. This assignment of sweepstakes entries to the user account is performed in response to an assignment request based upon a product purchase by the user. The selection controller selects one or more sweepstakes entries from the user account. The sweepstakes entries are selected in an order different from the assignment order based on the set of game characteristics associated with a particular game presentation. Ultimately, the results associated with the one or more sweepstakes entries selected by the selection controller are revealed to the user in response to a reveal request initiated by the user at a reveal station providing the particular game presentation.

An apparatus according to the invention may also include several other components. At least one and preferably a large number of reveal stations are included in the apparatus, each reveal station being operatively connected for communication with the selection controller. Each reveal station is operable for generating a respective reveal request in response to a user reveal request input. Each reveal station also preferably includes a display for displaying a representation of a result (or a cumulative total for multiple results) in the sweepstakes game. In some forms of the invention, a respective selection controller for each respective reveal station is implemented through a processing device included at the respective reveal station. Other embodiments of the invention employ a selection controller implemented at a data processing system separate from any reveal station, and this separate selection controller selects sweepstakes entries for a number of different reveal stations.

One or more point-of-sale stations and recharge stations may also be included in an apparatus embodying the principles of the present invention. Each point-of-sale station is operatively connected to the assignment controller for communicating the assignment request to the assignment controller in response to a product purchase at the point-of-sale station. Each recharge station provides a preferably unattended, user-operated device through which the product or additional product may be purchased. These additional product purchases entitle the user to additional sweepstakes game entries which may be revealed according to the invention.

The invention also includes a program product. This program product may be executed by one or more processing devices to implement the methods of the invention. In particular, one preferred program product according to the invention includes reveal request receiving program code and entry selection program code. The reveal request receiving program code is executable for receiving the reveal requests initiated by a user. The entry selection program code is executable for selecting the sweepstakes entries for the purpose of revealing sweepstakes results to the user. This selection is made in an order different from the order in which the sweepstakes entries were assigned to the user's account, and is based on the set of game characteristics for the game presentation associated with the reveal request.

These and other features of the invention will be apparent from the following description of the preferred embodiments, considered along with the accompanying drawings.

DESCRIPTION OF PREFERRED EMBODIMENTS

The invention will be described below in connection with a specific embodiment in which the product being purchased comprises Internet access time. It will be appreciated, however, that the invention is not limited to use in connection with the sale of any particular type of product or service and is certainly not limited to cases in which the product comprises Internet access time.

Figure 1:
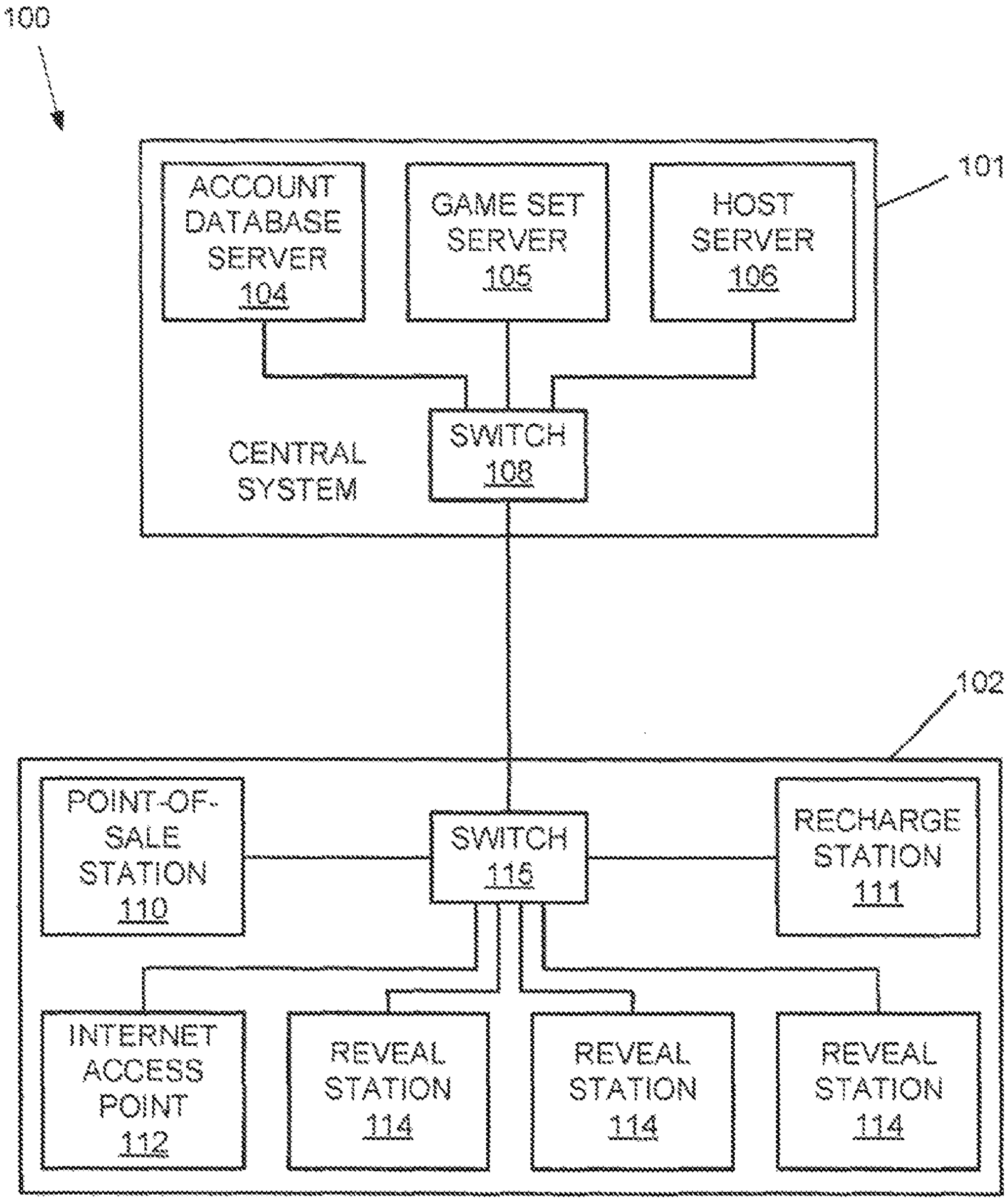
FIG. 1 is a diagrammatic representation of a sweepstakes system embodying the principles of the invention.

Referring to FIG. 1, a sweepstakes system 100 embodying principles of the invention includes a central system 101 for managing user accounts relating to the sale of Internet access time and relating to the play of a sweepstakes game offered in connection with the sale of Internet access time. Sweepstakes system 100 also includes a user system 102 which includes a number of devices that together allow a user to purchase Internet access time, use the purchased Internet access time, reveal sweepstakes entries assigned to a user based on the user's purchase of Internet access time, and redeem winnings associated with the revealed sweepstakes entries.

The illustrated central system 101 includes three separate processing devices, an account database server 104, a game set server 105, and a host server 106. Each of these separate processing devices may comprise a suitable computer system that operates under the control of respective operational program code. The example user system 102 shown in FIG. 1 includes four different types of devices, a point-of-sale station (POS) 110, a recharge station 111, an Internet access device 112, and several reveal stations 114. Details of these user system devices will be described below in connection with FIGS. 2 and 3.

The particular embodiment of the invention shown in FIG. 1 employs a communications arrangement utilizing switches to help facilitate communications between the various system components. Thus, central system 101 includes a switch 108 which is operatively connected for communication with a switch 115 included with the user system 102. It will be appreciated that the network topology shown in FIG. 1 is just one example of an appropriate network communications arrangement. The invention is not limited to any particular network topology or any particular communication technique or protocol. Also, although physical connections are indicated in FIG. 1, communications between system components may be wired or wireless within the scope of the invention. Furthermore, the invention is not limited to any particular numbers of devices included in the various device groups. The specific numbers of POSs 110, reveal stations 114, Internet access devices 112, and recharge stations 111 shown in FIG. 1 are shown only for purposes of example.

As will be described in detail below with reference to the flow charts of FIGS. 5 and 6, system 100 enables a user to purchase Internet access time at a POS 110 or recharge station 111. System 100 also assigns one or more sweepstakes entries to a user account that is correlated in some fashion, preferably through a suitable account identifier, to the user who purchased the Internet access time. The number of such sweepstakes entries assigned to the user account is based at least in part on the value of the product that the user has purchased at the respective POS 110 or recharge station 111. The sweepstakes entries are preferably assigned from a predetermined set of sweepstakes entries stored in central system 101. Components of central system 101 also maintain the user account for the user and also maintain records for the amount of Internet access time purchased by the user, Internet access time remaining available for use, sweepstakes entries for which results have been revealed to the user, sweepstakes entries for which results are available to be revealed, winnings associated with entries for which results have been revealed, and perhaps other information related to the user's purchased Internet access time and related to the sweepstakes entries that have been assigned to the user in view of the purchased Internet access time. The POS 110 at which the user may purchase Internet access time also preferably dispenses an account card to the user which may be used in accessing the various devices in user system 102 to perform actions such as revealing sweepstakes entry results, obtaining Internet access, purchasing additional Internet access time (and consequently being assigned additional sweepstakes entries), and redeeming sweepstakes winnings, for example.

Once a user has been assigned a user account and a number of sweepstakes entries, the user may go to a reveal station 114 and use their user account card, or information associated with the user account, to reveal the results for sweepstakes entries that have been associated with the user's respective user account. Revealing the results for the sweepstakes entries may produce a revealed result balance associated with the user account. This revealed result balance may represent the user's sweepstakes winnings which are available to be redeemed. The user may redeem the sweepstakes winnings at a suitable device included in user system 102, such as a POS 110. Some preferred forms of the invention require this sequence in participating in the sweepstakes game, that is, first purchasing the product entitling the user to sweepstakes entries, then revealing results associated with the user's sweepstakes entries, and finally redeeming any revealed winning results for cash or other prizes.

In the example central system 101 shown in FIG. 1, database server 104 maintains databases and data structures preferably used in sweepstakes system 100, including particularly the data structures representing the user accounts and related data structures. Game set server 105 manufactures sweepstakes games and may store sweepstakes game sets. These sweepstakes game sets preferably each include a number of predetermined sweepstakes entry records. Each such entry record is associated with a result in the sweepstakes game and is also preferably associated with some sweepstakes entry record identifier by which the respective entry record may be distinguished from other entry records. In some preferred forms of the invention, each sweepstakes entry record comprises a data structure including at least a result field for containing a result index value and a field for the record identifier. Other fields may include a prize value field for storing a prize value and a sequence indicator field for storing an indicator of the sequence of the respective record with respect to other sweepstakes entry records in the sweepstakes game. Host server 106 handles communications to and from POSs 110, reveal stations 114, Internet access devices 112, and recharge stations 111. In particular, host server 106 receives product purchase information from a respective POS 110, assigns the appropriate number of sweepstakes entries to the appropriate user account maintained at database server 104, and if the account is new, communicates account information such as a suitable user account identifier back to the respective POS 110. Host server 106 may also store sweepstakes record sets from the game set server 105 and may be responsible for serving as the assignment controller to assign sweepstakes entries to the respective user accounts. However, the database server 104 or game set server 105 may alternatively store sweepstakes record sets and host server 106 may obtain sweepstakes entry records from the database server or game set server, or cause the database server or game set server to communicate sweepstakes entry records or related information directly to the appropriate user system component as will be described further below with reference to FIG. 11.

The specific structure of a sweepstakes system embodying the principles of the present invention will depend in large measure on the nature of the product or products that may be purchased. Since the product being purchased in system 100 is Internet access time, the system includes Internet access devices 112 through which the user may gain Internet access according to their purchase of Internet access time. As will be described further below, the Internet access devices 112 may include a computer system through which a user may obtain Internet access. Alternatively, an Internet access device 112 may comprise or include a wireless gateway device through which a user may gain Internet access using their own wireless enabled portable computer or Internet appliance. Also, in the case where the Internet access device 112 is a computer system through which the user may obtain Internet access, the computer system may also be loaded with other software applications such as word processors, spread sheet applications, drafting/drawing applications, educational software applications, and computer games for example. This additional capability may provide a further incentive to a potential user to purchase time at such an Internet access device.

The example system 100 shown in FIG. 1 assumes the single central system 101 provides services for a single user system 102. In this arrangement, all of the elements in system 100 may be physically maintained at a location such as an Internet café or other facility where a product may be sold to entitle a user to some number of sweepstakes entries. However, other implementations of the invention may include a single central system that provides services for two different user systems. In some implementations, a central system such as central system 101 may be located at one facility, and one or more user systems such as system 102 may be located remotely from the single central system. In these cases having a remote user system 102, a suitable wired or wireless communications arrangement will be used to facilitate communications between the central system and the respective user systems.

Figure 2:
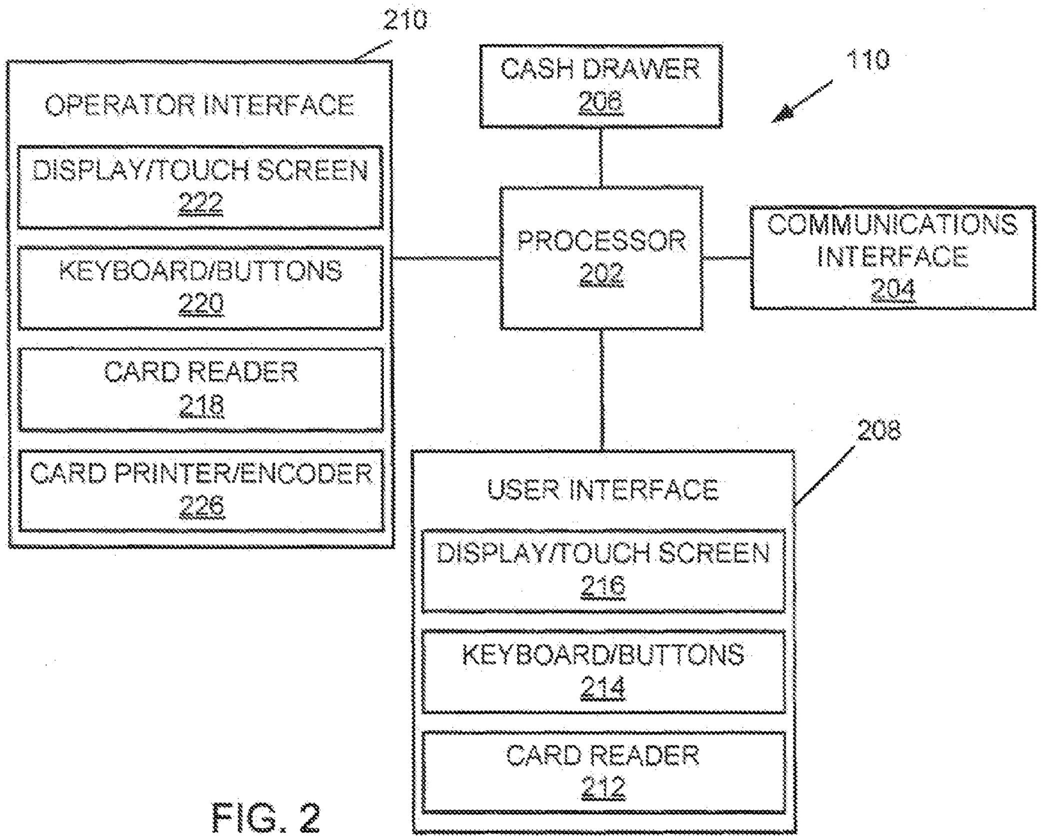
FIG. 2 is a diagrammatic representation of the point-of-sale terminal included in the sweepstakes system shown in FIG. 1.

FIG. 2 provides a diagrammatic representation of an example POS 110 that may be used in gaming system 100 shown in FIG. 1. The illustrated POS 110 includes a processor 202 that communicates with central system 101 through a communications interface 204 such as a suitable network interface card. Processor 202 controls a cash drawer 206 and also communicates with a user interface 208 and an operator interface 210.

User interface 208 includes a card reader 212 for reading information from a user's account card. The account card is a physical card such as a credit card, a gift card, or any other type of card that can be correlated to a user account. In one preferred embodiment, the account card may also be printed with sweepstakes indicia that correlate to the sweepstakes entries that have been assigned to the user/user account, and/or information about a particular purchase of a product or service entitling the user to some number of sweepstakes entries. However, a user ticket showing sweepstakes indicia and other information may be separate from a user account card or may be omitted altogether. In one preferred form of the invention, card reader 212 comprises a mag stripe reader and the account cards and any user tickets used in the system contain information encoded on a stripe of magnetic material formed on the respective user account card or user ticket. However, the invention is not limited to any particular technology for encoding the required information on a user account card or user ticket. For example, card reader 212 may comprise an optical scanner adapted to read bar codes, recognize graphic characters, and/or read any other optical arrangement in which information may be encoded. As another example, card reader 212 may comprise a smart card reader for reading information from a user account card carrying a suitable data storage device. Also, it will be appreciated that card reader 212 may comprise a combination device adapted to read multiple different types of media or may comprise multiple devices for reading different types of media. In particular, a user interface within the scope of the invention may include one card reader for reading a user account card dedicated for the user account employed in the sweepstakes system, and another card reader for reading another type of account card, such as a credit card used for purchasing the desired Internet access time, or a single card reader device adapted to read both types of cards.

The keyboard and/or arrangement of mechanical buttons 214 is included in user interface 208 to allow the user to make various inputs at the respective POS 110. For example, a user may be required to enter an account identifier and/or a personal identification number (PIN) as part of a transaction at the POS 110. Keyboard/buttons 214 may also enable a user to enter certain requests or commands at POS 110. For example, a user may be required to enter a value of Internet access time to be purchased and enter a purchase request and/or verify the purchase request.

Part or all of the functionality implemented through keyboard/button arrangement 214 may also, or alternatively, be implemented in a display/touch screen 216. Display/touch screen 216 may also be used to display other information or graphics to the user. Alternative forms of the invention may include only a display device as part of the user interface and not a display/touchscreen. It is also possible that a user interface associated with a POS 110 within the scope of the invention might not include a display.

As with user interface 208, the illustrated operator interface 210 includes a card reader 218, keyboard/button arrangement 220, and a display/touch screen 222. Card reader 218 may comprise any of the types of card reading devices described above with reference to card reader 212. Generally, card reader 218 may be used to read information from a user account card, a user ticket, or both. Keyboard/button arrangement 220 and display/touch screen 222 allow an operator to enter information and commands. Display/touch screen 222 also allows various notices or other information to be displayed to the POS operator. However, some forms of the invention may include only a display with the operator interface rather than a display/touch screen, and rely on operator inputs through keyboard/button arrangement 220 and card reader 218. Operator interface 210 also includes a card printer/encoder 226 which may be used to print and/or encode user account card and/or user tickets according to the present invention. It will be appreciated that one device may be included at a POS 110 to print a user ticket and a separate device may be included to encode information on a user account card.

Although the example POS 110 shown in FIG. 2 includes a dual interface arrangement, that is, a user interface 208 and separate operator interface 210, it will be appreciated that other forms of the invention may not include dual interfaces at the POS 110. Some sweepstakes systems according to the present invention may use operator or cashier attended POSs that include only an operator interface similar to interface 210, and no user interface. In these types of systems, the customer provides information to the POS operator/cashier who then enters the information into the system through the operator interface. A user may also be required to hand their account card and/or user ticket to the POS operator/cashier so that the card/ticket may be scanned with a suitable card reader/scanner associated with the POS. Yet other POS arrangements within the scope of the invention may employ a shared operator interface and user interface, in which both the operator/cashier and customer have access to various components such as a card reader, keyboard/button arrangement, and display/touch screen device. Some forms of the invention may include no printer/encoder and instead rely on user account cards that are pre encoded with an appropriate account identifier and/or user tickets that are preprinted with the required information.

Numerous variations are possible in a device that may be used as a POS 110 in implementations of the present invention. For example, although a user account card is preferably issued to a user as part of an initial user account set up procedure, some implementations of the present invention do not employ any user account card or any other physical item to be held by the user. In these implementations, some arrangement other than a card reader is required to identify a user account for a given user. For example, rather than reading a user account from a user account card, the system may require a user to enter their user account in some fashion. Other implementations of the invention may identify a user's account by identifying the user. For example, a POS 110 may include a suitable system for identifying a user by their physical appearance and may access the user's account by correlation to the user's physical appearance. Also, some forms of sweepstakes systems that employ the present invention may assign user accounts at a user system device separate from a POS 110. For example, some sweepstakes implementations may employ a separate account creation terminal (not shown) for creating a user account and issuing any required user account card. The user would then go to a POS 110 or recharge station to purchase Internet access time.

Figure 3:
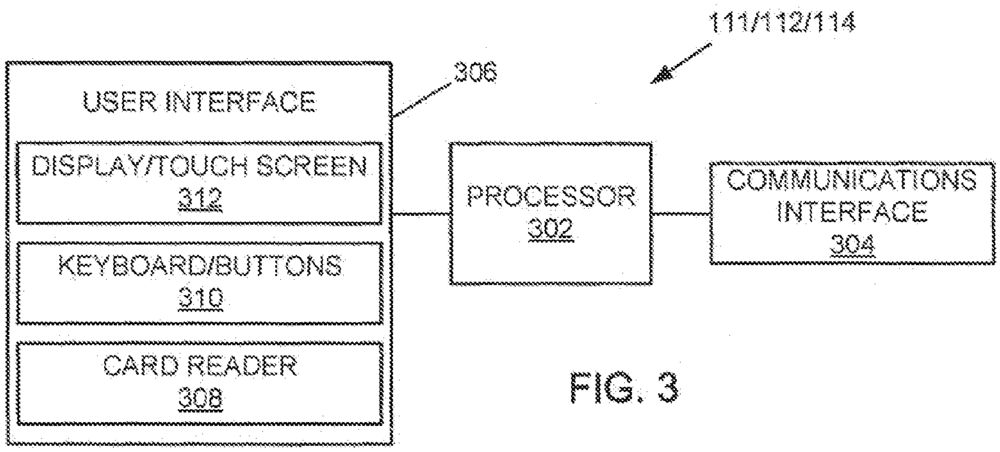
FIG. 3 is a diagrammatic representation of an Internet access device, reveal station, and/or recharge station included in the sweepstakes system shown in FIG. 1.

FIG. 3 provides a diagrammatic representation of a system that may comprise either an Internet access device 112, reveal station 114, or recharge station 111 within the scope of the present invention. Each of these system devices may generally include a processor 302 connected for communications to the remainder of the sweepstakes system through a suitable communications interface 304 which may be similar to interface 204 shown in FIG. 2. Each system device (111, 112, and 114) also includes a user interface 306. The illustrated user interface 306 includes a card reader 308, keyboard/button arrangement 310, and display/touch screen 312. Card reader 308 comprises a suitable device for reading a user account card and/or a user ticket. The reader may comprise any of the card reading arrangements described above with reference to card reader 212 shown in FIG. 2. Keyboard/button arrangement 310 may comprise any arrangement of physical buttons, controls, or keys to allow a user to input the desired commands to use the particular device 111, 112, or 114. For example, where the device comprises an Internet access device 112, keyboard/button arrangement 310 may comprise a computer keyboard and a pointing device such as a mouse or trackball. Where the device comprises a reveal station 114, keyboard/button arrangement 310 may, for example, include a play button that allows a user to make a reveal request input to initiate a reveal request as will be discussed further below. The keyboard/button arrangement 310 for a reveal station may also include controls for enabling the user to select a game presentation by which sweepstakes entry results are to be revealed. Although an Internet access device 112 may include a display/touch screen 312 as shown in FIG. 3, an Internet access device may include simply a computer monitor with no touch screen capability. However, a display device associated with a reveal station 114 may include a display with touch screen capability for enabling the user to make inputs in the course of revealing sweepstakes entry results or to initiate the revealing of results. Further controls that may be associated with a reveal station 114 will be described below in connection with the example game presentation shown in FIG. 9. Recharge stations 111 also preferably include a touch screen display as shown at 312 in FIG. 3 for enabling users to enter appropriate commands at the recharge station. However, the functionality of a recharge station 111 within the scope of the present invention may be provided with a suitable display device together with a suitable mechanical keyboard/button arrangement.

It will be appreciated that the example systems shown in FIGS. 1 through 3 are shown only for purposes of example and convenience in describing the present invention. Numerous variations on these systems may be included within the scope of the present invention. For example, the systems in FIGS. 2 and 3 are based on a general purpose computer model, in which processes are performed or controlled by a respective general purpose processor 202/302 executing operational program code. Other forms of the invention may include special purpose processors for performing and controlling the various functions of the sweepstakes distribution system shown in FIG. 1. Also, although a single general purpose processor is shown for the POS 110 in FIG. 2 and system device 111/112/114 shown in FIG. 3, multiple general purpose processors may be used in some implementations. Similarly, although FIG. 1 shows three separate computing systems 104, 105, 106, associated with central system 101, the various functions provided by the central system may be distributed across more or fewer computer systems within the scope of the invention. It should also be noted that although reveal stations 114 are described above as video-style devices in which sweepstakes entry results are presented to the user via a video presentation, some or all of the reveal stations included in system 100 may use a non video type presentation to reveal sweepstakes results to the user. In particular, a mechanical reel machine may be used as a reveal station 114 to reveal sweepstakes results to a user.

One particular preferred arrangement for central system 101 includes separate services that handle various operations in the sweepstakes system. These services may be implemented through separate data processing devices (servers) included in central system 101. For example, rather than the three servers shown in FIG. 1, a sweepstakes system in which the present invention is implemented may include a POS service for supporting functions at POSs 110, an account creation service for supporting account creation terminals, an Internet service for supporting requests for Internet access through Internet access devices 112, a reveal station service for supporting functions available through reveal stations 114, and a management terminal service for supporting system management functions available through a system management terminal (not shown). Also, the invention is not limited to any particular arrangement for maintaining the databases used in the sweepstakes system. Although a single account database server 104 is shown in FIG. 1, multiple database servers may be employed in the sweepstakes system. One preferred arrangement includes a sweepstakes and Internet time database server and a separate card account server (both not shown in the figures). The sweepstakes and Internet time database server maintains databases associated with sweepstakes game sets and sweepstakes entries assigned to various users, and databases associated with Internet access time that has been purchased by the various system users. The card account database server maintains databases associated with user accounts in the sweepstakes system.

Those skilled in the art of data processing systems will appreciate that FIGS. 1 through 3 show highly simplified representations and omit many data processing system details. Such system details include power supplies, nonvolatile storage devices, volatile memory, cooling fans, touch screen controllers, and graphics processors for example. With respect to central system 101 in FIG. 1, an operator interface is also omitted from the figure. These system details are omitted from the drawings so as not to obscure the invention in unnecessary detail. The absence of these system details in the drawings is not to be construed as indicating that these common computer system components would not or could not be included in a given implementation of a sweepstakes system in which the present invention may be implemented.

Figure 4A:
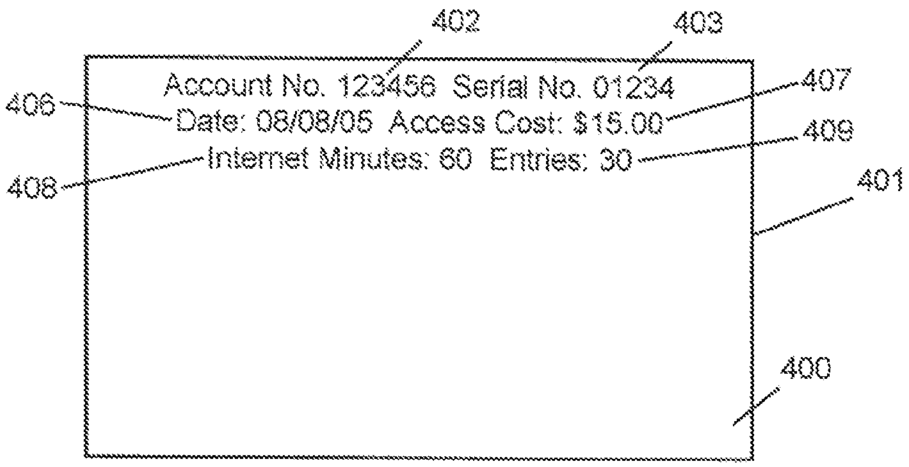
FIG. 4A is a diagrammatic representation of one side of a user account card according to one embodiment of the invention.

FIG. 4A is a diagrammatic representation of a first side 400 of a user account card 401 that may be used in a sweepstakes system according to the present invention. User account card 401 may bear a user account identifier 402, and a game serial number 403 identifying the respective sweepstakes game from which entries are taken. Some forms of the invention print indicia (not shown) on user account card 401 in a suitable position such as in the open area shown on the first side 400 of the user account card so that the card also functions as a sweepstakes ticket. Each such printed indicia may be associated with a respective sweepstakes entry assigned to the user associated with the ticket/user account card. First side 400 of the example user account card 401 is also printed with a date 406 indicating the date the user account card was issued, a cost of purchase value 407, a total access time value 408, and a value 409 indicating the number of sweepstakes entries associated with the user account card.

Figure 4B:
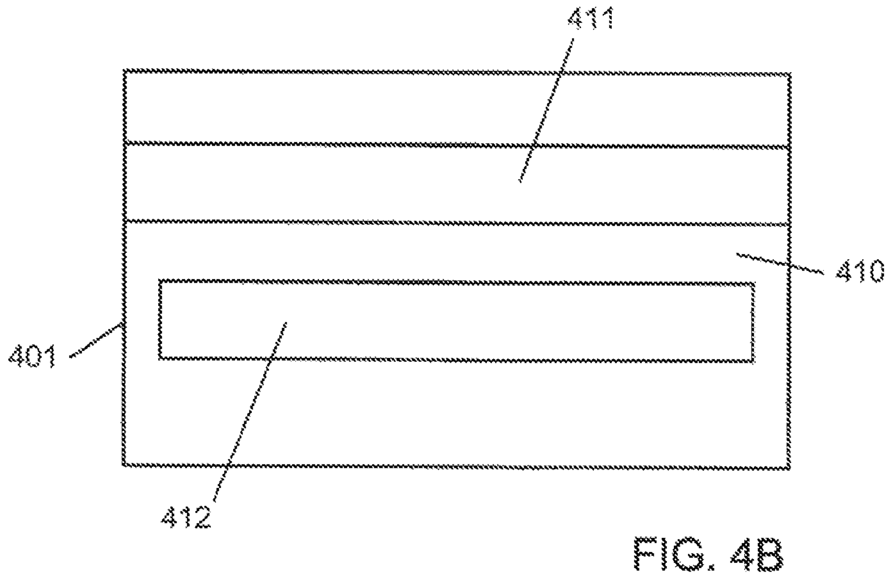
FIG. 4B is a diagrammatic representation of the opposite side of the user account card shown in FIG. 4A.

FIG. 4B illustrates the opposite side 410 of the user account card 401 shown in FIG. 4A. The opposite side 410 includes a strip of magnetic media 411 that may be encoded with various data according to the invention. As used here and in connection with alternate forms of user tickets described below, “encoded” means that the data is encoded in some machine readable form and is not necessarily readable to a person without the aid of a machine. A signature space 412 is also included on side 410 of user account card 401.

A user account card that may be used in the present sweepstakes system may include numerous variations from the example user account card 401 shown in FIGS. 4A and 4B. Of course, rather than a magnetic strip 411, the user account card 401 could include a bar code or other type of optically read code (not shown). Other forms of a user account card may include a memory circuit for storing the data that may be stored on magnetic strip 411 in the example user account card 401. Also, a user account card within the scope of the invention need not have the particular configuration of example user account card 401. Alternate user account cards may include a magnetic strip or other data carrying arrangement on the same side of the ticket/card as any printed card identifying information. User account cards also need not be rectangular. The substrate from which a user account card is formed may be paper, plastic, or any other suitable material for a given combination of features to be included on the user account card.

Regardless of whether the data is encoded on a magnetic strip such as strip 411 in FIG. 4B, or encoded in a bar code, memory circuit, or any other device or arrangement on the card, the user account card is preferably associated with the purchased product and preferably the user’s sweepstakes entries through information recorded on the user ticket. That is, information recorded on the user account card associates the user account card with the product which was purchased to entitle the user to the sweepstakes entries. This information may be recorded on the ticket in a number of different fashions. In one arrangement, the user account card is encoded with the account identifier (such as account identifier 402) that may also be printed or otherwise formed on the card. A product identifier such as access time value 408 in FIG. 4A, a purchase price such as price 407 in FIG. 4A, or any other information may be printed and/or encoded on the user account card to associate the user account card with the purchased product. The user account card may also be encoded with the sweepstakes game serial number such as serial number 403 shown in FIG. 4A.

Some implementations of the invention may use a user account card with no identifying information other than the user account identifier encoded on the card. This user account identifier may be used to access all of the necessary data associated with the user account stored in suitable data structures maintained by the sweepstakes system. This user account card arrangement, without any printed information on the purchased product or sweepstakes entries assigned to the user, has the advantage that it may be used repeatedly to access the user’s account to add Internet access time and/or facilitate revealing sweepstakes results at a reveal station (114 in FIG. 1) and/or redeeming sweepstakes winnings through a POS (110 in FIG. 1). As will be discussed further below, it is possible to implement the system merely encoding a user account identifier on a user account card because a suitable system component such as account database server 104 shown in FIG. 1 stores the sweepstakes entry data and other information regarding the user account, and this information may be accessed as required through the user account identifier.

As indicated above in connection with FIG. 2, some forms of sweepstakes systems according to the present invention may use both a user account card and a user ticket. The user account card may be used solely to identify the user account for purposes of using purchased Internet access time, revealing sweepstakes results, and redeeming sweepstakes results that have been revealed. The user ticket in these implementations may be printed with the information shown on card 401 in FIG. 4A, and perhaps indicia correlated to assigned sweepstakes results.

Figure 5:
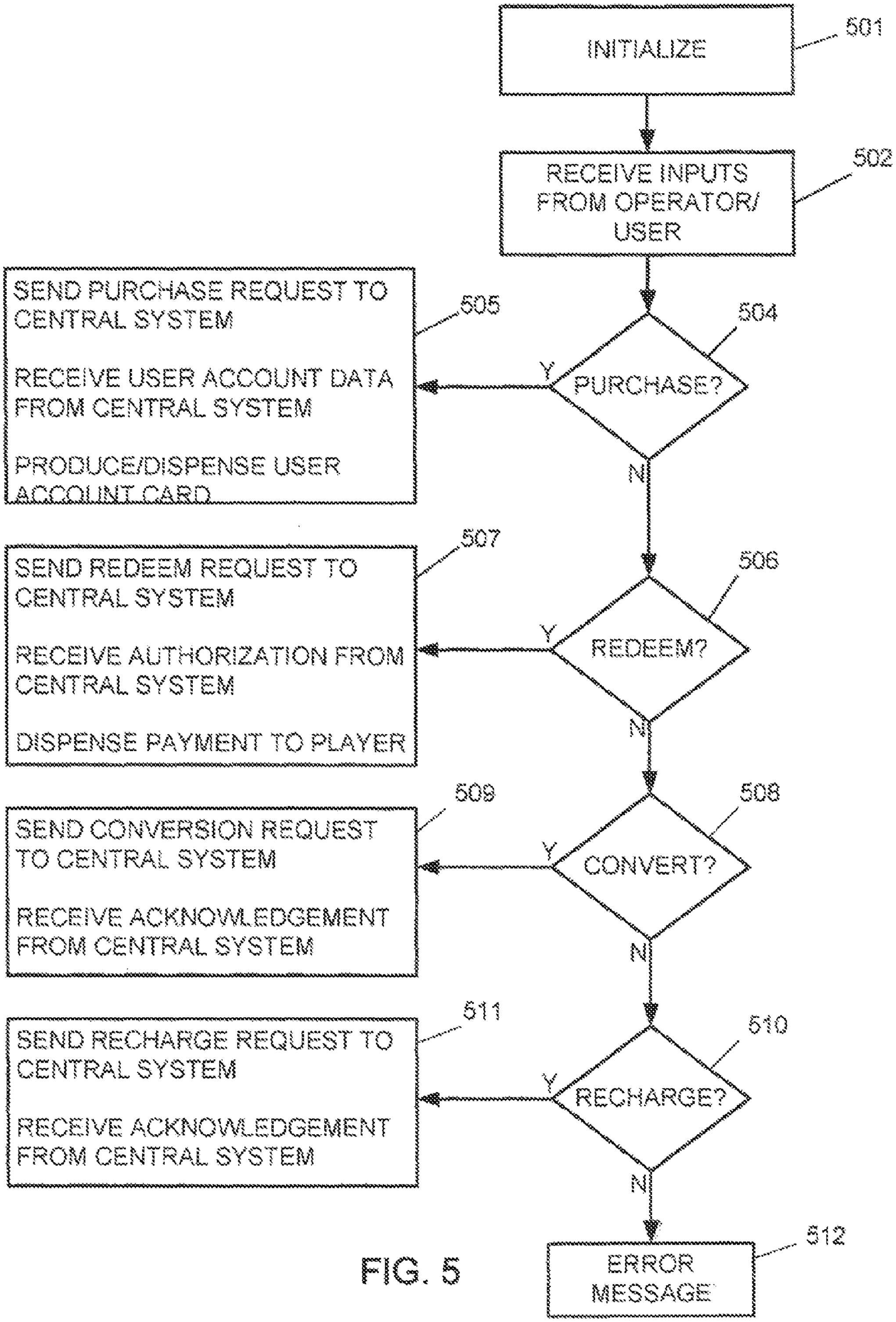
FIG. 5 is a flow chart showing process steps associated with the operation of the point-of-sale terminals in one preferred form of the present invention.

The flow chart of FIG. 5 shows process steps associated with the operation of the POS 110 in the example sweepstakes system 100 shown in FIG. 1. After the POS 110 is initialized as indicated at process block 501, the POS receives certain inputs from either the POS operator/attendant or a user as indicated at process block 502. If these inputs represent a product purchase request for a new user account, that is, a request to purchase Internet access time for a new user account as indicated at decision block 504, POS 110 goes through the steps indicated at process block 505 in order to complete the purchase of Internet access time and produce the user account card. If the input received at process block 502 does not represent a request to purchase Internet access time but instead represents a request to redeem sweepstakes winnings as indicated at decision block 506, POS 110 then goes through the sweepstakes winnings redemption process indicated at process block 507 in FIG. 5. If the inputs received at process block 502 represent a request to convert sweepstakes winnings into additional Internet access time and obtain additional sweepstakes entries as indicated at process block 508, POS 110 then goes through the winnings conversion processes shown at process block 509. The final option shown in the example of FIG. 5 is that the inputs received at process block 502 represent a request to recharge an existing user account by buying additional Internet access time. This purchase of additional Internet access time will also cause the user account to be assigned additional sweepstakes entries. In this user account recharge case indicated by a positive outcome at process block 510, the POS 110 proceeds to the recharge process shown at process block 511 in FIG. 5. In the example process shown in FIG. 5, the only four possible inputs at block 502 are (1) requests to purchase Internet access time, (2) requests to redeem sweepstakes winnings, (3) requests to convert sweepstakes winnings into additional Internet access time, and (4) requests to recharge a user account (i.e., requests to purchase additional Internet access time for an existing user account). Thus, if the inputs at block 502 are not recognized as any of these types of requests, then POS 110 produces an error message for the operator and/or user as indicated at block 512, and waits for additional inputs.

The inputs received at POS 110 as indicated at process block 502 in FIG. 5 may be entered in any number of ways within the scope of the invention. Where POS 110 includes a user interface such as that shown at 208 in FIG. 2, the user may make the desired inputs themselves through that interface. Where POS 110 includes only an operator interface such as that shown at 210 in FIG. 2, or where both operator and user interfaces are included, a user may ask the POS operator/attendant to make suitable inputs through the operator interface. In any case, the inputs may require entering at least some information required to complete the request. For example, suitable inputs at block 502 for a purchase of Internet time for a new account may require user identifying information from a driver’s license or credit card to create the new account for the user. The user may also be required to enter a personal identification number (PIN) that may be required for certain types of access to the user’s account. The inputs for purchasing Internet access time for a new account will also include inputs to indicate the amount of Internet access time being purchased. The inputs representing a request to redeem sweepstakes winnings may include the user account identifier which may be read or scanned from a user account card by card reader 212 or 218 shown in FIG. 2, and preferably a user's PIN entered through any of the input devices 214, 216, 220, or 222 shown in FIG. 2. Additional inputs may be required to indicate the amount of sweepstakes winnings that are to be redeemed. The inputs required for a conversion request as indicated at decision block 508 in FIG. 5 may include the user's account identifier, perhaps the user's PIN, and inputs to indicate the amount of sweepstakes winnings to be converted to additional Internet access time. Finally, the inputs required for a recharge request as indicated by the positive outcome at decision block 510 will generally include the user's account identifier and the amount of Internet access time to be purchased.

The specific process steps required for completing a purchase of Internet access time at process block 505 may also vary greatly from one implementation of the invention to another. Generally, completing an Internet access time purchase request includes sending to the central system (101 in FIG. 1) all of the information necessary to open an account and complete the purchase of Internet access time, including the amount of Internet access time to be purchased. All of this information is represented at block 505 in FIG. 5 as a purchase request. A purchase request will generally require at least information on the amount of Internet access time being purchased, and information identifying the requesting POS 110. The information on the Internet access time being purchased may be entered at the POS 110 (FIG. 1) by the user or the POS operator/attendant depending upon the configuration of the respective POS. In one form of the invention, central system 101 is responsible for both managing Internet access time and assigning sweepstakes entries. Thus, in this preferred arrangement the communication for requesting Internet access time may be combined with the communication for requesting sweepstakes entries. Also, in some forms of the invention, the communication requesting Internet access time may itself represent a request for sweepstakes entries. Once the sweepstakes entry request and Internet access time request are communicated to the appropriate system component or components, POS 110 waits for a return communication that includes sufficient information for the POS to cause a user account card or perhaps a user ticket, or both to be dispensed. This information may include only the user account identifier for cases in which only an account card is dispensed. However, where other information is to be included on a user ticket or user ticket/user account card, additional information may be returned from central system 101, such as data regarding each sweepstakes entry assigned for the purchase of Internet access time, a serial number to be assigned to the user ticket, and perhaps other information. Ultimately, the POS 110 causes the appropriate user account card and/or user ticket to be dispensed for the user. This process may include selecting an appropriate user account card from stores of preprinted or partially preprinted user account cards at the POS 110, or may include printing and/or encoding information on a blank user account card substrate. POS 110 may also issue a printed receipt for the purchase of Internet access time in the system.

It should be noted that the process associated with process block 505 described above assumes that it is possible to both create a new account and simultaneously purchase Internet access time at the POS 110. As mentioned above, some sweepstakes systems that may employ the present invention may require accounts to be created through a separate account creation terminal. In this case, the account creation terminal would commonly issue any user account card, and no account card would be dispensed at the POS 110. The process for purchasing Internet access time in this case would be similar to that described below in connection with process block 511.

The processes performed at block 507 in FIG. 5 will depend at least in part upon the manner in which sweepstakes entries are associated with a user account in the given implementation of the system. Where only a user account identifier is encoded on the user account card, and no direct information on the assigned sweepstakes entries is printed on a user ticket or user account card, the processes at block 507 preferably include causing a communication to be sent to the appropriate system component to obtain sweepstakes winnings information. For example, central system 101 shown in FIG. 1 may store sweepstakes winnings information so as to be accessible by the user account identifier. In this example, POS 110 causes a communication to be sent to central system 101 by which the central system may recall sweepstakes winnings information such as the amount of sweepstakes winnings available to be redeemed for the user's account. The communication from the POS may simply include the user's account identifier, perhaps an amount the user wishes to redeem, and identifying information for the requesting POS. The information received from central system 101 may include an authorization for the amount of sweepstakes winnings to be redeemed. In any event, POS 110 would receive the requested information from central system 101 as indicated at block 507 in FIG. 5, and the POS operator/attendant would then be authorized to pay to the user the amount of sweepstakes winnings requested to be redeemed. This payment may be in cash for cash prizes, or may be in any other suitable form of payment. Where sweepstakes prizes are physical items, the payment may involve dispensing the physical item at the POS or dispensing a voucher at the POS which may be redeemed at some other location such as a sweepstakes headquarters location or at a prize redemption station (not shown in the figures). It will be noted that some preferred forms of the invention require that the results associated with a user's sweepstakes entries must be revealed first in a suitable process such as through a reveal station (114 in FIG. 4) before any winnings associated with those entries may be redeemed. Thus, the central system 101 in FIG. 1 preferably maintains records for both the number of sweepstakes entries that have been assigned to a user's account and are available to have the associated results revealed to the user, and records for the sweepstakes results that have been revealed to the user together with a total value of the revealed results that are available to be redeemed by the user.

The processes required at POS 110 to convert sweepstakes winnings to additional Internet access time may also vary significantly within the scope of the present invention. The processes indicated at process block 509 includes communicating a conversion request to central system 101 (FIG. 1). This conversion request may include a value for the amount of winnings to be converted. In response to this request, the POS 110 may receive back from central system 101 an acknowledgment indicating that the request has been granted and the various data structures maintained by the central system updated to reflect the conversion of sweepstakes winnings to additional Internet access time. In preferred forms of this invention, this conversion of winnings will also result in additional sweepstakes entries being assigned to the user's account so that they are available to be revealed to the user. As with a purchase of a new account as described above with reference to process blocks 504 and 505, POS 110 may also produce a receipt for the user providing a printed record of the conversion transaction.

The processes required at POS 110 to recharge a user's account, that is, add additional Internet access time and assign additional sweepstakes entries based on that additional access time, may also vary significantly within the scope of the present invention. The processes indicated at process block 511 include sending a suitable recharge request to central system 101. This recharge request may include information on the amount of additional Internet access time being purchased (in the form of a dollar amount or time value for example), the user account number associated with the recharge request, and identifying information for the requesting POS. Regardless of the specific nature of the recharge request to central system 101, the POS 110 ultimately receives back an acknowledgment indicating that the user's account has been modified in accordance with the recharge request. This acknowledgment may include information on the new value of Internet access time available on the user's account and the new number of sweepstakes entries that have been assigned to the user's account. As with the original purchase operation and conversion of winnings operation, the POS 110 may also print a receipt for the user to provide a printed record of the additional Internet access time purchased and sweepstakes entries assigned.

Figure 6:
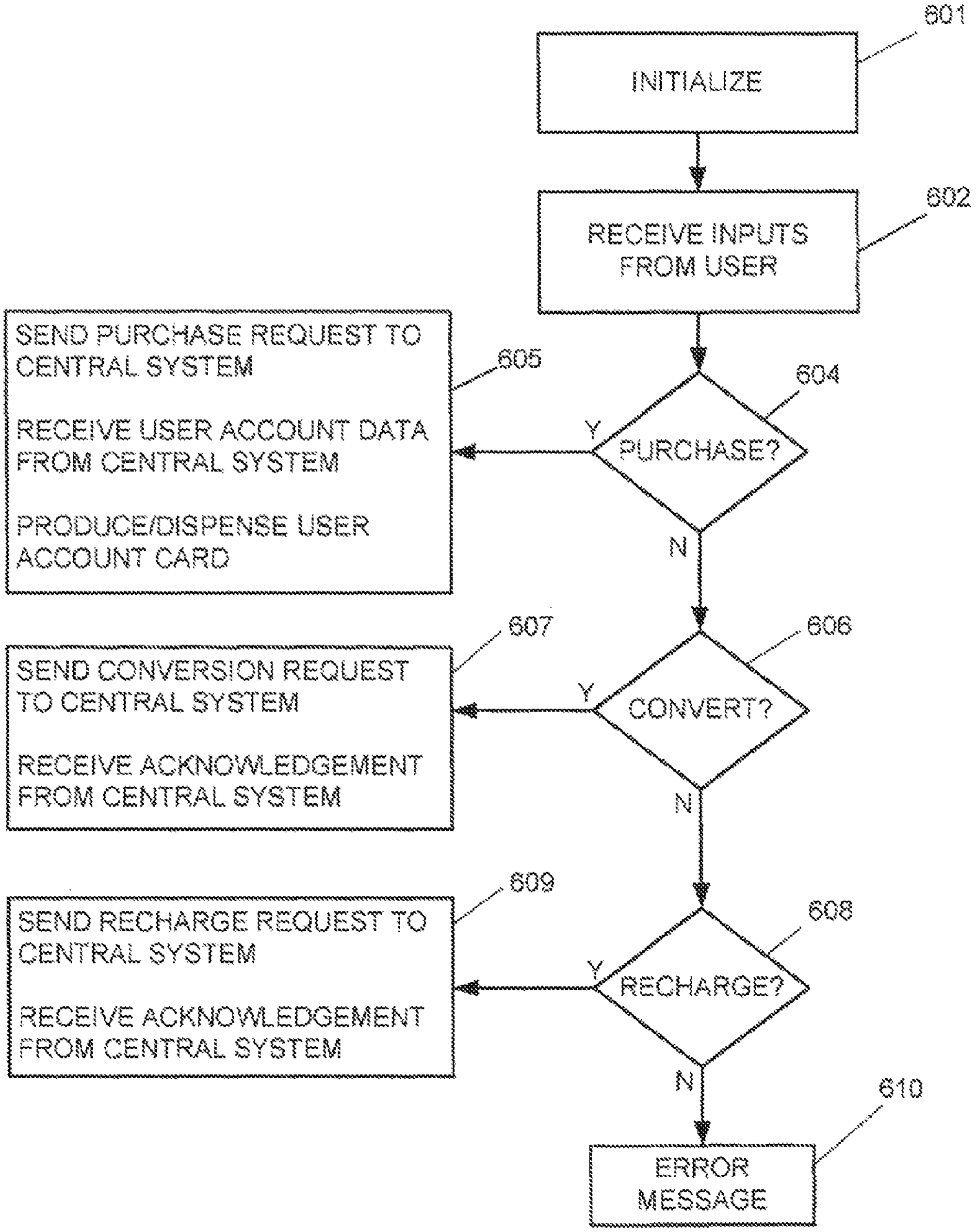
FIG. 6 is a flow chart showing process steps associated with the operation of a recharge station according to one preferred form of the present invention.

FIG. 6 shows process steps associated with the operation of a recharge station such as that shown at 111 in FIG. 1. In one preferred form of the invention, recharge station 111 represents an unattended device or kiosk having a user interface to allow a user to perform certain functions which will typically be a subset of functions allowed at an attended device such as POS 110 in FIG. 1. In the example process shown in FIG. 6, a user may purchase Internet access time for a new account, convert sweepstakes winnings to additional Internet access time, and recharge an existing user account by purchasing additional Internet access time for the account. Each of these actions preferably automatically result in the assignment of sweepstakes entries to the appropriate user account. Specifically, once recharge station 111 is initialized as indicated at process block 601, the recharge station may receive user inputs as indicated at process block 602. If the inputs received represent a request to purchase Internet access time for a new account as indicated by a positive result at decision block 604, the process proceeds to the Internet access time purchase steps shown at process block 605. In the event the user inputs received as indicated at process block 602 represent a request to convert sweepstakes winnings to additional Internet access time as indicated at decision block 606, the recharge station 111 performs the processes shown at process block 607. Finally, if the user inputs received at process block 602 represent a recharge request to purchase additional Internet access time for an existing account as indicated by a positive result at decision block 608, the recharge station performs the processes shown at process block 609. In this example shown in FIG. 6, if the user inputs are not interpreted as a purchase request, conversion request, or recharge request then the recharge station 111 returns an error message to indicate to the user that the inputs received at block 602 were not understood and waits for additional user inputs. The processes performed at process blocks 605, 607, and 609 correspond to the similar processes performed at process blocks 505, 509, and 511, respectively, shown in FIG. 5. Since the processes are generally the same, they will not be described again here.

Numerous types of interfaces may be employed at a POS 110 or recharge station 111 to facilitate the various functions provided by these devices. For example, touch screen or mechanical button controls may be used to provide shortcuts to the user/operator. One preferred implementation of a POS 110 and recharge station 111 may include a "quick refill" control which can be used to produce a request to use all of the user's sweepstakes winnings, or some predefined amount of such winnings, to purchase additional Internet access time and receive additional sweepstakes entries. Such shortcut functions save having to manually enter information to effect a desired transaction in the sweepstakes system.

Figure 7:
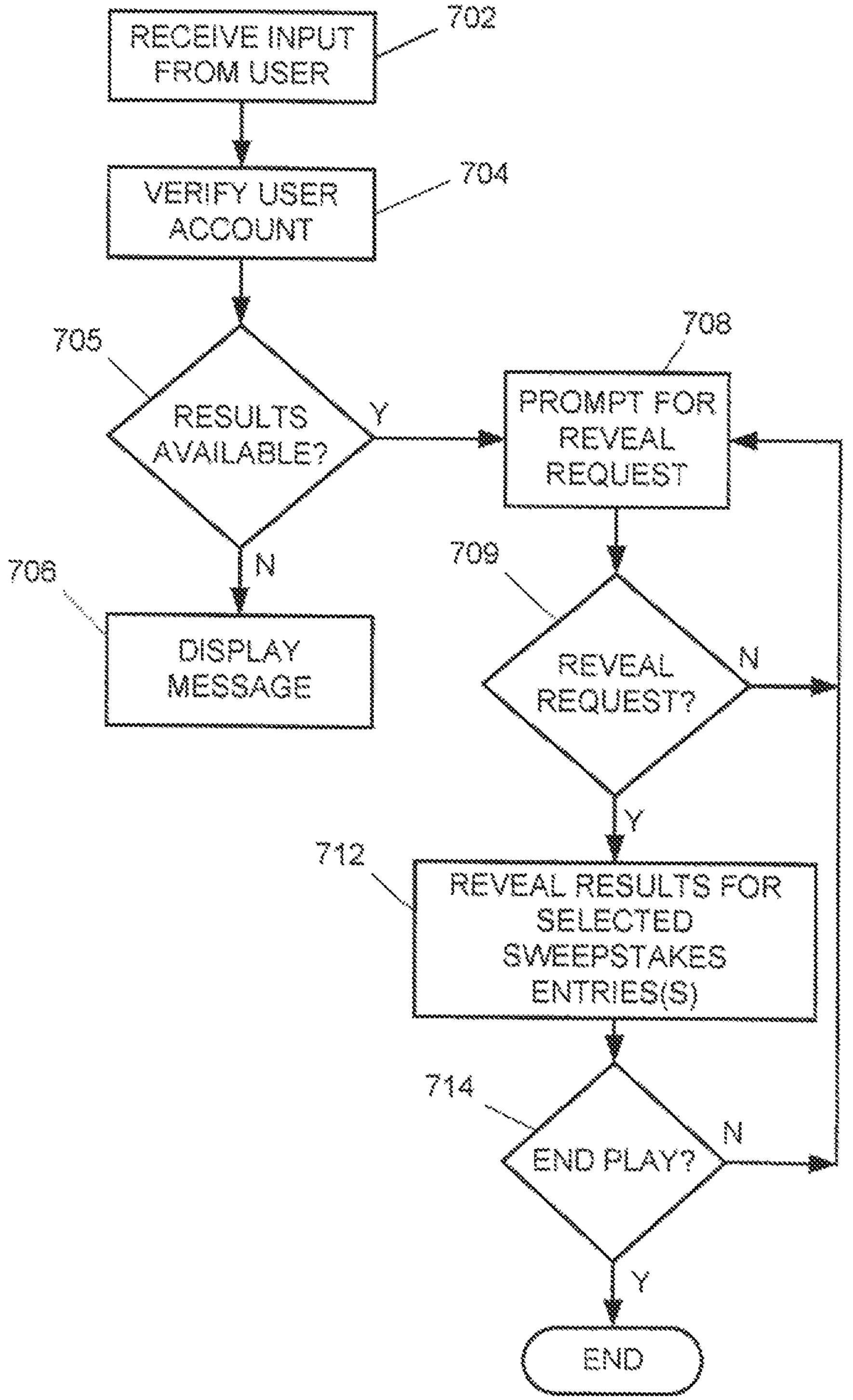
FIG. 7 is a flow chart showing process steps associated with the operation of a reveal station according to one preferred form of the present invention.

FIG. 7 shows one preferred process that may be employed at a reveal station such as a reveal station 114 shown in FIG. 1. This process results in one or more sweepstakes results being revealed to the user. The example process shown in FIG. 7 includes first receiving a suitable input from a user as indicated at process block 702. This input preferably comprises a suitable login input and may include reading the user account card at a reader device associated with the reveal station, such as card reader 308 shown in FIG. 3. Alternatively, a user may be allowed to manually input a user account identifier using a suitable interface associated with the reveal station 114. Especially where a user account identifier may be manually entered, the login procedure may require the user to also input a PIN that has been associated with the user's account. In any event, the user input received a process block 702 should be sufficient to allow the reveal station 114 to verify the user account for the user as indicated at process block 704 in FIG. 7. This verification may involve sending the entered account identifier to central system of 101 (FIG. 1) and awaiting a verification response. If the user account verification response received from central system 101 indicates that sweepstakes results are not available for the account as indicated by a negative result at decision block 705, reveal station 114 preferably displays an appropriate message to the user as indicated at block 706 to advise the user that there are no results available to be revealed and to suggest that the user purchase additional Internet access time to obtain additional sweepstakes entries for which results may be revealed.

As indicated at process block 708 in FIG. 7, reveal station 114 preferably produces a suitable prompt in the event that results are available to be revealed for the user account identified in the login procedure shown at blocks 702 and 704. This prompt is for the user to enter a reveal request input at the reveal station. Such a reveal request input may be entered at the reveal station 114 in many different fashions within the scope of the present invention. For example, a reveal request input may be entered simply by pressing a "play" button included at the reveal station. Some preferred forms of the invention, however, allow a user to specify a denomination of sweepstakes entries to be revealed in a reveal request. Thus, additional inputs may be required for a complete reveal request input. Regardless of whether one or multiple physical inputs are required at a reveal station 114 to form a complete reveal request input, the reveal request input ultimately results in a reveal request to be generated at the respective reveal station. The reveal request is represented by data that is eventually communicated to and received by the selection controller which is responsible for selecting sweepstakes entries to be revealed to the user.

Once a reveal request has been received as indicated by a positive outcome at decision block 709, reveal station 114 proceeds to reveal results for selected sweepstakes entries as indicated at process block 712. The invention encompasses numerous graphic arrangements that may be used to reveal sweepstakes results. An example of a reel-type or slot machine-type game presentation will be described further below with reference to FIG. 9. However, it will be appreciated that a game presentation provided at a reveal station 114 within the scope of the present invention may include a card game, a dog race or horse race, or many other types of game presentations. The manner in which sweepstakes entries are selected for revealing results as indicated at process block 712 will be described below in connection with FIG. 8. The user may eventually enter a suitable input to end play at reveal station 114. Ending play terminates the process at reveal station 114 and may cause the station to go to an attract mode to attract another user to log in and reveal sweepstakes results. If play has not ended after a particular reveal request has been honored by the process at block 712, the process loops from decision block 714 back to determine if additional sweepstakes results are available to be revealed.

The invention encompasses numerous different techniques for selecting sweepstakes entries for revealing results as indicated at process block 712 in FIG. 7. According to the invention, the sweepstakes results are selected in a selection order different from an assignment order in which entries were assigned to the user account. This selection order is used to allow the invention to better match a desired set of player characteristics for a given game presentation. For example, a given game presentation that may be implemented at a reveal station 114 may be associated with a desired overall win frequency and/or a desired win frequency at one or more different prize levels defined by the game presentation. The play characteristics for a game presentation also include the different prize levels that are available in the game presentation. It should be noted that these prizes available for a given game presentation may be entirely different from the prizes associated with the sweepstakes game from which entries are assigned to the user account.

The processes disclosed herein for selecting sweepstakes entries to be revealed in an order different from the assignment order have the benefit of allowing a single sweepstakes game set to be used in connection with a number of different game presentations having different play characteristics. However, there may still be instances in which an entry selection process according to the present invention is not able to select a group of entries having a total prize value that exactly matches a given prize level that is desirable for a given reveal request. In this case, the entry selection process as described further below will select sweepstakes entries having a total value greater than the prize level that is desirable for the given reveal request. Since the total prize value associated with the selected sweepstakes entries is greater than the value of the prize in the game presentation, there will be a remainder value equal to the total prize value of the selected sweepstakes entries minus the value of the prize level awarded for the reveal request. This remainder value may be considered revealed for purposes of redeeming sweepstakes entries, and is preferably tracked as a value separate from "winnings" associated with reveal requests. Thus, if a user redeems winnings associated with revealed sweepstakes entries, the total amount that may be redeemed may be expressed as an amount of winnings plus a remainder value. Also, as described below in connection with FIG. 8, the remainder value may be used in the selection process for subsequent reveal requests, and actually applied as a portion of the prize awarded for a subsequent reveal request.

Figure 8:
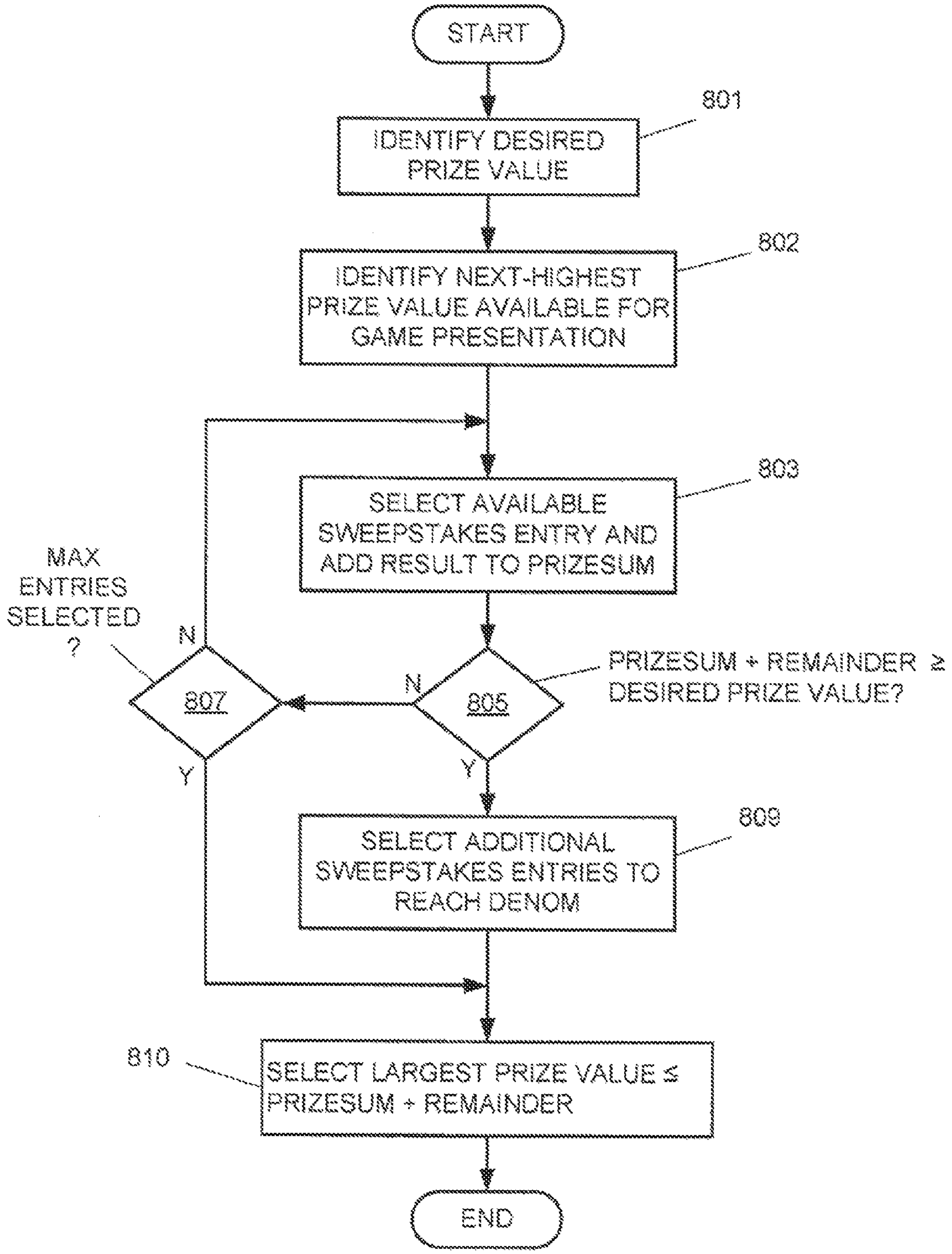
FIG. 8 is a flow chart showing one preferred process for selecting sweepstakes entries to be revealed to a user according to the present invention.

The preferred sweepstakes entry selection process shown in FIG. 8 is particularly suited for selecting multiple sweepstakes entries for revealing results for a single reveal request. In other words, a reveal request according to the invention may request more than one sweepstakes entry result to be revealed at a time at a particular reveal station. In one preferred arrangement, each sweepstakes entry is associated with a unit value and a player may make a reveal request for a range of different multiples of this unit value. For example, a reveal request may designate five sweepstakes entry units to be revealed for a given reveal request, in which case five sweepstakes entries are selected to be revealed. Other preferred forms of the invention define a given play for a given game presentation as requiring some number of sweepstakes entries. For example, a play for a game presentation may be defined as requiring one hundred sweepstakes entries. In this example, a reveal request for one play represents a request to reveal the results for one hundred of the sweepstakes entries that have been assigned to the requesting user's account. Also, some preferred game presentations allow multiple plays in a single reveal request. Continuing with the previous example, a user may designate two plays in a reveal request for the game presentation, in which case the reveal request would amount to a request to see results for two hundred of the user's sweepstakes entries.

Referring to FIG. 8, a preferred sweepstakes entry selection process (such as that conducted at process block 712 in the process shown in FIG. 7) includes first identifying a desired prize value, that is, a prize value desired to be shown to the player for a given reveal request. This process of identifying a desired prize value is shown at process block 801 in FIG. 8, and may be performed in a number of different fashions. One preferred process for identifying a desired prize value includes first producing a skewed prize distribution as shown at process block 802, and then selecting a prize from that skewed distribution as indicated at process block 803. The prize value associated with the prize selected at block 803 represents the desired prize value.

A preferred process of identifying a desired prize value shown in FIG. 8 employs information from the user's account and applies this information along with the desired prize distribution associated with the given game presentation to produce the skewed prize distribution as indicated at process block 802. A preferred algorithm for calculating each prize frequency in the skewed prize distribution is as follows:

$$sf\_i=f\_i*P\_i$$

where sf_i is the skewed prize frequency for a given prize level "i" in the respective game presentation, f_i is the desired prize frequency for the given prize level "i" in the given game presentation, and P_i is a probability value representing generally the probability that after the prize value corresponding to prize level "i" is deducted from the user's account of total prize value available to be revealed (cash balance), the remaining number of plays taken from the desired prize distribution for the game presentation will yield a total prize value equal to the remaining cash balance for the user.

The probability values P_i are preferably taken from a lookup table generated by simulating the play of the given game presentation. The lookup table includes rows defined as percentiles and columns defined as a number of games played. Each element in the lookup table is a prize value which is based on simulation of the given percentile number of credits won when the given number of plays are made at the desired prize distribution for the game presentation.

The resulting prize distribution produced in the process indicated at process block 802 provides a list of the prize values available in the given game presentation, with a skewed frequency sf_i associated with each prize value. It will be noted that the skewed frequency associated with prize values higher than the user's remaining cash balance will be equal to zero. This prevents the desired prize value identified at process block 801 from being a prize too high to be paid (covered) by the user's remaining cash balance. Generally, the process indicated at process block 802 will result in higher frequencies for nonzero prizes when the user's account has a relatively high ratio of remaining cash balance to "coupon balance," where the "coupon balance" equals the number of sweepstakes entries left to be revealed to the user. The relativity here is with respect to the ratio that one would expect as the average pay percentage for the given game presentation. Conversely the frequency skewing process will result in relatively lower frequencies for nonzero prizes when the user's account has a relatively low ratio of remaining cash balance to coupon balance.

After creating the prize distribution skewed to reflect the condition of the user's account regarding sweepstakes entries, the process of selecting a prize from the skewed distribution indicated at process block 803 preferably includes generating a random number with a suitable random number generation process. This random number is applied in a suitable process as is known in the art to select a prize from the skewed prize distribution.

After identifying the desired prize value, the process includes identifying a next highest prize value available for the given game presentation. This step is shown at process block 806 in FIG. 8 and may be performed by analyzing the paytable for the game presentation and selecting from that pay table the smallest prize that is larger than the desired prize value identified at process block 801.

Once the desired prize value has been identified as indicated at process block 801 in FIG. 8 and the next highest available prize has been identified as indicated at process block 806, the process selects an available sweepstakes entry from the respective user's account as indicated at process block 807. In particular, the process selects the largest valued sweepstakes entry available in the user's account such that the result associated with that entry plus any previously selected entries plus any remainder value remains less than the next highest prize value identified at process block 806. The process at 807 in FIG. 8 preferably includes marking the selected entry in the appropriate databases as one to be revealed, and adding the value to a running total which may be referred to as "prizesum."

After the selection has been made at process block 807 and result added to the prizesum value, the process checks to determine whether the prizesum value plus any remainder is greater than or equal to the desired prize value identified at process block 801, but less than the next highest prize for the game identified at process block 806. This inquiry is indicated at decision block 809. If the result of the inquiry is negative, the process proceeds to determine whether the maximum number of entries has been selected as indicated at decision block 811. This maximum number is the number of entries for which the player has requested results to be revealed in the given reveal request. If the result of the inquiry is negative at decision block 811, the process loops back to select another available sweepstakes entry in the process shown at process block 807. This selection of available sweepstakes entries continues until the inquiry at process block 809 produces a positive result, that is, until the prizesum value plus any remainder value is greater than or equal to the desired prize value identified at process block 801 and less than the next highest prize value identified at block 806. At that point the process selects any additional sweepstakes entries from the user account that may be necessary to reach the designated maximum number of entries that the player has specified in the reveal request. This step is shown at process block 813 in FIG. 8. Typically this process will include selecting zero valued entries (entries not associated with any prize) until the desired number of entries is reached. The selections at blocks 807 and 813 select the particular entries that will be revealed for the given reveal request. With the particular entries to be revealed determined, the process selects the largest prize value available in the pay table for the game presentation which is still less than or equal to the prizesum value plus any remainder value. This selection shown at process block 814 defines the game presentation prize value that will be revealed to the user for the reveal request.

In the event that the maximum number of sweepstakes entries are selected as indicated by a positive outcome at decision block 811 before the prizesum value plus any remainder value is greater than or equal to the desired prize value, the process moves from decision block 811 to process block 814 at which point the largest available prize is selected based on total value of selected entries plus any remainder.

It will be noted that the process described in connection with FIG. 8 is dependent upon the play characteristics associated with the game presentation through which the sweepstakes results are to be revealed. Thus, each game presentation available for revealing sweepstakes results according to the process shown in FIG. 8 will be associated with a respective entry selection process unique to the play characteristics of the game presentation. The different selection processes for different game presentations available through reveal stations 114 are preferably stored at a suitable location and invoked as necessary for use in connection with the respective game presentations for selecting sweepstakes entries. Where the reveal station 114 performs the selection process, that is, where a reveal station processor serves as the selection controller, suitable program code for performing the selection process is executed at the reveal station. Performing the selection process shown in FIG. 8 at the reveal station 114 will also require that the reveal station obtain the required user account information (such as coupon balance and cash balance for example) from the system component maintaining the user account data (such as account database server 104 of central system 101 shown in FIG. 1).

Where the selection process is performed by a selection controller at a central location, such as by a reveal station service (described above) at central system 101, the central system may maintain a library of selection processes including a suitable selection process for each game presentation available for revealing results in the sweepstakes system. The central system 101 applies from this library the selection process which corresponds to the game presentation from which the given reveal request was initiated. The process of storing the library of selection processes and applying the appropriate selection process may be performed with selection process library program code executed by central system 101. Other forms of the invention using centralized entry selection by a centralized selection controller may invoke a single selection process for each reveal request, but the single selection process uses stored data corresponding to the given game presentation and stored data regarding the particular user account in order to perform the selection process properly for the given game presentation and reveal request.

It will be noted that when the component or components that serve as the selection controller are at a centralized location (such as one or more processing devices included at central system 101 in FIG. 1), these component will receive a reveal request indirectly through a respective reveal station 114. That is, the input to produce a reveal request at the respective reveal station 114 ultimately results in information representing a reveal request to be communicated from the reveal station to the centralized selection controller so that the centralized selection may select sweepstakes entries to be revealed for the reveal request.

It will also be noted from the process shown in FIG. 8, that the process may be performed for each reveal request made for a given game presentation. However, if the number of entries to be revealed for each reveal request is known, the entry selection process may be performed prior to the user entering the reveal request. Other forms of the invention may not perform a respective selection process for each reveal request. Rather, a selection process may be performed to produce a script which identifies the respective sweepstakes entries to be revealed for each of a number of reveal requests.

Another variation within the scope of the present invention for selecting sweepstakes entries for revealing results for a given reveal request also involves producing a script of results to be revealed for a number of consecutive reveal requests that may be entered by a given user. However, this alternate arrangement includes identifying the total value of sweepstakes entries available to be revealed and then splitting up the sweepstakes entries and/or combining the sweepstakes entries to produce a string of results in the game presentation that comes as close as possible to matching some target result string for the given game presentation. This target result string represents a string of results that would be expected according to the design of the game presentation. Once the string of results is produced, the reveal station is controlled to follow the script of results. That is, the first reveal request causes the first result in the string of results to be shown to the user, the second reveal request causes the second result in the string of results to be shown to the user, and so forth until the script of results in exhausted.

Figure 9:
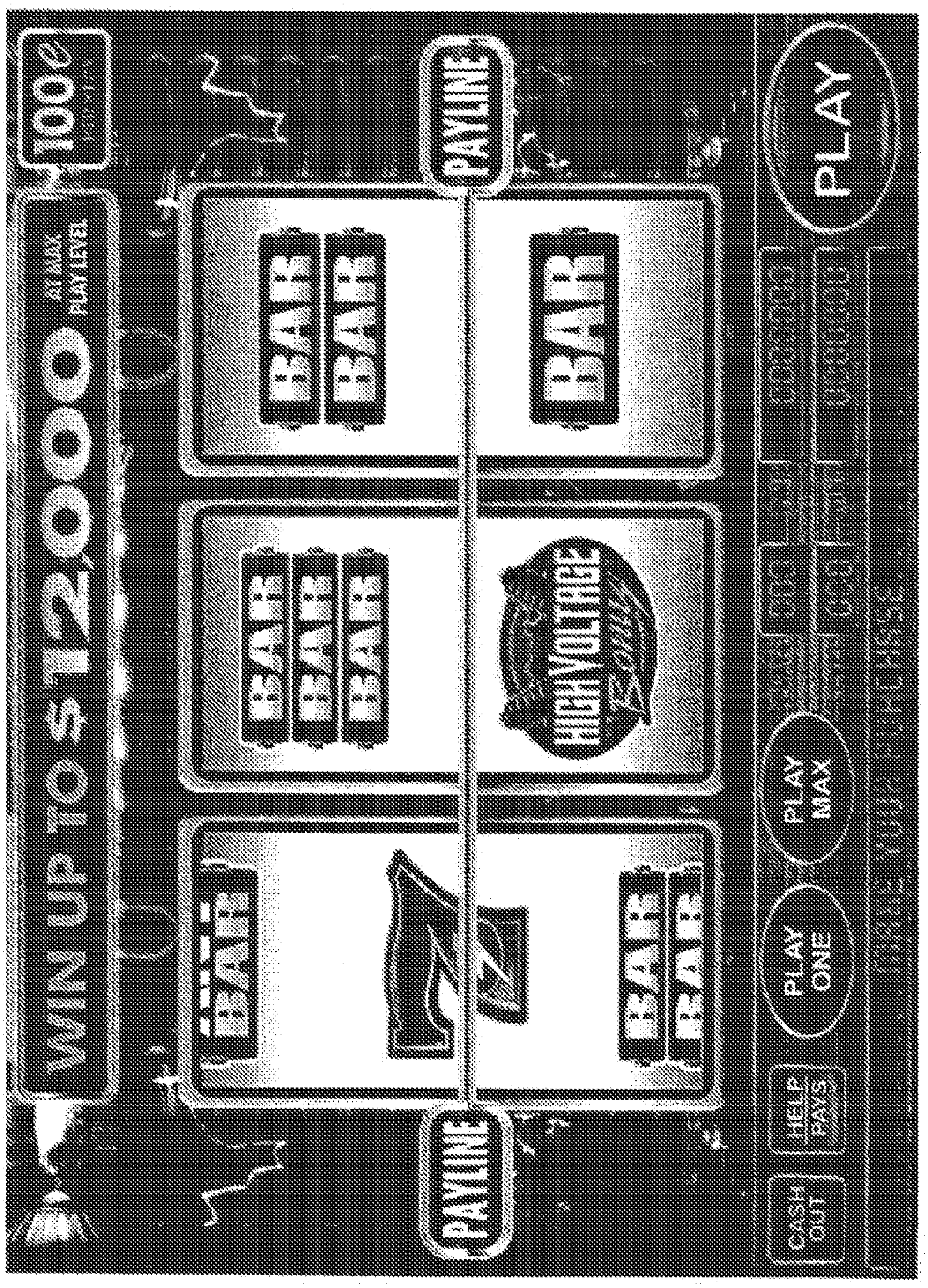
FIG. 9 is a representation of a portion of a game presentation that may be employed to reveal sweepstakes results to a user according to the invention.

FIG. 9 shows a portion of a game presentation for revealing sweepstakes results within the scope of the present invention. This particular game presentation comprises a reel-type or slot machine-type game that includes three spinning reels 901, 902, and 903, and a single payline 904 through the reel symbol locations. The user interface associated with this game presentation includes a touch screen-implemented "Play" button 907 a "Play Max" button 908, a "Play One" button 909, "Cash Out" button 910, and a "Help/Pays" button 911. A result request may be initiated through this interface in several different fashions. In one option, a player selects a number of plays by successively invoking the Play One button 909. This determines the number of sweepstakes entries to be revealed for the reveal request. Once number of entries is identified, the user presses the Play button 907 which causes the display to initially show reels 901, 902, and 903 spinning, and ultimately come to rest to show a result for the sweepstakes entries selected to be revealed for that reveal request. The sweepstakes entries to be revealed may be selected in any suitable fashion, and particularly using the preferred methods described in connection with FIG. 8. The Play Max button 908 may be invoked to cause results for the maximum number of entries (for the respective game presentation) to be revealed after invoking the Play button 907.

The game presentation shown in FIG. 9 includes four separate windows which provide status information regarding the user's account. A "Plays" window 914 shows the number of entries available for the user account. The "Level" window 915 shows the number of multiples of entries per play. The "Paid" window 916 shows the total (cumulative) sweepstakes result for the just completed reveal request. The "Wins" window 917 shows the winnings that have thus far been revealed to the user but not redeemed. The number of entries per play for the game presentation shown in FIG. 9 is one hundred sweepstakes entries as indicated by the label shown at reference numeral 920.

Figure 10:
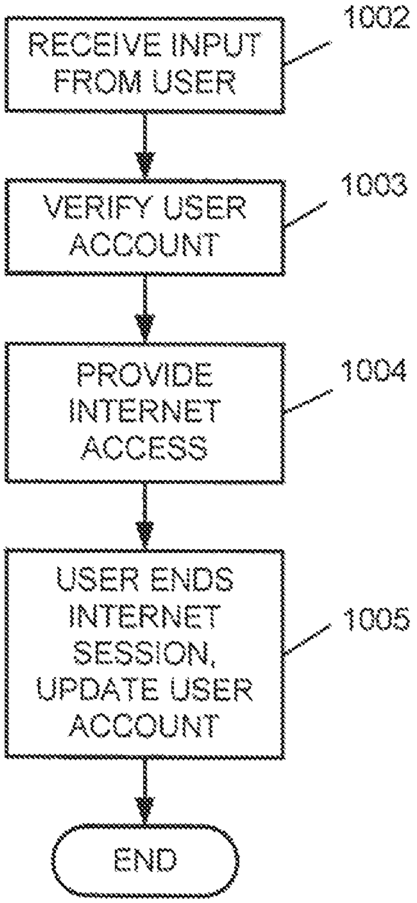
FIG. 10 is a flow chart showing process steps associated with the operation of an Internet access device according to one preferred form of the present invention.

FIG. 10 illustrates a process performed at an Internet access device in a sweepstakes system according to the invention, an Internet access device such as device 112 shown in FIG. 1 for example. As indicated at process block 1002, the Internet access device first receives an input from the user. This user input is used to log the user in at the respective Internet access device. Once the user account is verified as indicated at process block 1003 as having Internet access time available, the process at the Internet access device includes providing Internet access as indicated at process block 1004. Internet access is provided until the Internet session ends, such as when the user exhausts their purchased Internet access time or when the user enters some input to terminate the Internet session. At this point, the sweepstakes system component responsible for managing the user's Internet access time (such as an Internet service as described above) updates the user account as indicated at process block 1005, to show the new value of Internet access time associated with the account. The process then terminates until the next input at process block 1002 to log a user on to the device. An Internet access device such as device 112 shown in FIG. 1, may include any suitable software for facilitating Internet use. In particular, an Internet access device that may be used in the present sweepstakes system may include Internet browser software for use in the Internet session, various plugins for the browser software, email software to facilitate sending and receiving email, and software to allow audio and video files to be played at the Internet access device. As indicated above, other types of applications may also be loaded on the Internet access device and access to the device also allows the user to use any of these other applications loaded on the Internet access device.

The various inputs required and communications indicated in FIG. 10 may vary widely within the scope of the invention. In one implementation, the input received at process block 1002 may simply be a signal from a suitable account card reading device resulting from a read of the user's account card. This signal may include the user's account identifier or information that allows the user's account identifier to be discerned. Other user inputs such as a PIN input or other input may be required to start the Internet access session. The verification step shown at process block 1003 may include a communication of the user's account identifier and requesting device identifier to the system component responsible for managing the user's account. In the example system shown in FIG. 1, central system 101 may be responsible for user account management, and thus the communication from the Internet access device required at process block 1003 would be a communication from the Internet access device to the central system. In one preferred implementation, the user account management component sends a verification communication back to the requesting Internet access device. This verification preferably includes a signal to enable the Internet access device for Internet access together with a signal representing the value of Internet access time available for the user's account. This preferred verification enables the Internet access device to track the Internet access time being used. However, some forms of a sweepstakes system embodying the principles of the invention may include merely an enabling signal in the verification response back to the requesting Internet access device. Where the Internet access device tracks the use of Internet access time during an Internet access session, the update indicated at process block 1005 includes communicating information from the Internet access device to the account management component. This information may include a new Internet access time value, or a value for the amount of Internet access time that has been used in the session. It will be appreciated that the component of central system 101 responsible for managing the user's Internet access time may also or alternatively time the Internet access to properly maintain the user's Internet access account. In this case, the responsible central system component may periodically communicate to the Internet access device a signal indicating the remaining access time available for the Internet access device to display to the user.

Figure 11:
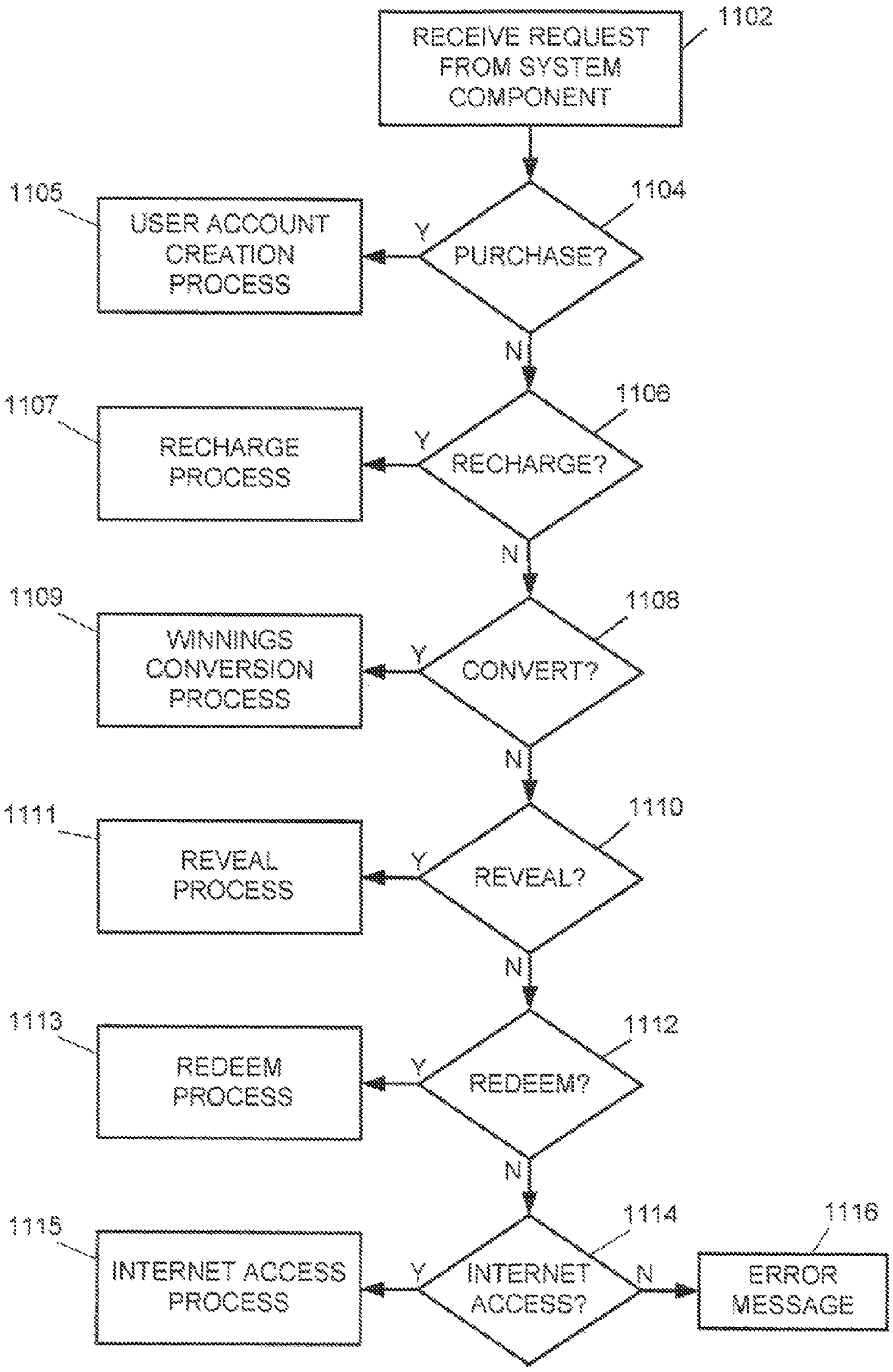
FIG. 11 is a flow chart showing process steps associated with the operation of the central system according to an embodiment of the invention.

FIG. 11 shows the processes performed at a central system, such as central system 101 shown in FIG. 1, in connection with the purchase of Internet access time and handling of sweepstakes entries in one preferred form of sweepstakes system. Central system 101 supports various requests received from other system components (from user system 102 in FIG. 1) as indicated at process block 1102. If the received request is a request to purchase Internet access time for a new account as indicated at process block 1104, central system 101 performs the user account creation process shown at block 1105. This process may include setting up data structures or data table entries for storing account information for the user's account. For example, the data structures set up by central system 101 may include an arrangement for storing Internet access time available to the user and an arrangement for storing sweepstakes entries assigned to the user together with status information indicating which entries have been revealed and which entries have been redeemed for the associated prizes. The process at block 1105 also preferably produces an account identifier for the user account, stores that account identifier in the user's account information, and returns the account identifier to the requesting device so that it may be encoded on the user's account card or otherwise provided to the user. The user account creation process shown at 1105 is also associated with a purchase on Internet access time, the process also preferably includes assigning sweepstakes entries to the user account from a game set for the sweepstakes game. The sweepstakes entry assignment process may include identifying some number "X" of entries to be assigned based on the amount of product purchased, and then assigning the next X available sweepstakes entries from the previously randomized set of sweepstakes entries for the sweepstakes game. Alternatively, the X sweepstakes entries may be selected at random from a randomized or ordered set of sweepstakes entries. Regardless of how the sweepstakes entries are selected for assignment to the user's account, the sweepstakes entries are assigned in an assignment order. As discussed above particularly in connection with FIG. 8, the sweepstakes entries are preferably not selected to be revealed in this assignment order.

It will be noted that the user account creation process may not require communicating any information back to the requesting device (such as a POS 110 in FIG. 1), other than the account identifier which has been assigned to the user's account. However, additional information may be communicated to the requesting device as required for producing any user ticket or receipt that may be produced at the requesting device.

If the received request is a recharge request, that is, a request to add Internet access time to an existing user account as indicated a process block 1106, central system 101 performs the recharge process shown at process block 1107. This recharge process includes updating the user account information stored by central system 101 to show the additional Internet access time that has been purchased and to assign additional sweepstakes entries to the user's account in response to the purchase of the additional Internet access time. In forms of the invention that produce no user ticket carrying indicia for the assigned sweepstakes entries, the recharge process shown at process block 1107 may include no communication back to the requesting device other than perhaps an acknowledgment that the user account has been appropriately updated. However, some implementations of the system may include communicating updated user account information to the requesting device, and this updated account information may be displayed to the user through a suitable display (such as 216 or 222 in FIG. 2 or 312 in FIG. 3) associated with the requesting device. The updated account information may include an updated total for Internet access time available for the account and an updated total for the number of sweepstakes entries available to have the associated results revealed. Information may also be sent back to the requesting device to allow the requesting device to create a receipt or user ticket where such receipts or tickets are produced in the system.

If the received request is a request to convert sweepstakes winnings to additional Internet access time as indicated at process block 1108, the process at central system 101 includes performing the winnings conversion process indicated at process block 1109. This process includes updating the user account information maintained by central system 101, including updating the Internet access time value by adding the access time purchased with sweepstakes winnings. This update of the user account also includes assigning sweepstakes entries to the user account since the additional Internet access time entitles the user to additional sweepstakes entries. As with the recharge process shown at process block 1107, the winnings conversion process shown at process block 1109 may include either no communication back to the device from which the conversion request was initiated, communicating an acknowledgment, or communicating updated account information back to the requesting device.

If the incoming request (received as indicated at process block 1102) is a request to reveal results associated with sweepstakes entries as indicated at process block 1110, central system 101 performs the reveal process indicated at block 1111. This process may include updating the user's account to show which entries have been revealed and updating any other data maintained for the user account to the extent that the data is changed by virtue of the reveal request. It should be noted that the actions taken by central system 101 in the reveal process shown at process block 1111 will depend largely upon whether the central system selects entries to be revealed for the reveal request or a process executed at the requesting reveal station performs the entry selection process. Where central system 101 performs the selection process, the central system has local access to the user account information necessary to perform the selection process. However, where the requesting reveal station 114 performs the entry selection process, the central system 101 must supply the reveal station with information from the user's account to enable the reveal station to perform the selection process. In this case, central system 101 may rely on data returned from the entry selection process executed at the reveal station (114 in FIG. 1). For example, one preferred reveal process 1111 at central system 101 includes communicating sweepstakes entry information for the user account to the requesting reveal station from which the reveal request was initiated. This sweepstakes entry information includes the number of entries available to be revealed and the result associated with each entry. The requesting reveal station 114 then uses this sweepstakes entry information to select the particular entries to be revealed for a given reveal request entered by the player at the reveal station. In one preferred implementation of the sweepstakes system, central system 101 communicates the sweepstakes entry information to the reveal station 114 at the time the user logs in to the reveal station by inputting their user account identifier in some fashion at the reveal station. Then the reveal station selects the respective sweepstakes entries for each reveal request thereafter entered at the reveal station until the user logs out. The reveal station 114 may communicate information back to the central system 101 after each reveal request and selection of sweepstakes entries to be revealed, or may maintain this information after each reveal request and only communicate updated information back to the central system when the user logs out at the reveal station.

If the request (received at process block 1102) is a request to redeem revealed sweepstakes results as indicated at process block 1112, the central system 101 shown in FIG. 1 performs the redeem process indicated at process block 1113. This redeem process includes updating the data for the user's account to indicate that the respective sweepstakes entries associated with the revealed results have been redeemed. In some preferred forms of the sweepstakes system, the user may choose to redeem all or only some portion of their winning sweepstakes results. In these cases the redeem request received as indicated at process block 1102 will indicate how much of the revealed results are to be redeemed. The redeem request may indicate that all revealed results are to be redeemed, or may indicate that some amount less than the total revealed results are to be redeemed. For example, a particular user may have $50 worth of revealed sweepstakes results to be redeemed, and the redeem request may indicate that only $30 of the total is to be redeemed. The user may leave the remaining $20 of revealed sweepstakes results in their user account, or may enter (or cause to be entered) a conversion request to convert the remaining $20 balance to additional Internet access time. Central system 101 would respond to this conversion request by performing the conversion process indicated at process block 1109 and discussed above. In any even, the redeem process at block 1113 ultimately updates the user's account to show the proper balance of revealed but unredeemed sweepstakes results. Any suitable data structures can be used in this regard. One preferred arrangement keeps a separate data table entry for each sweepstakes entry assigned to the user account, and maintains one or more status fields for each such table entry to indicate the status of the entry as having been revealed and having been redeemed. The redeem process in this case includes changing the data table entry for each redeemed sweepstakes entry to indicate that the result for the entry has been redeemed.

Finally, if the incoming request received at process block 1102 is a request for Internet access, central system 101 performs the Internet access process indicated at process block 1115. This Internet access process maintains the value of the Internet access time associated with the user's account by timing the Internet session and appropriately updating the user's account. For example, each user account may be associated with a time value indicating the user's available Internet access time. Central system 101 times Internet access for a user, then subtracts the used time from the account value at an appropriate point, such as when the user ends their Internet session. In one preferred arrangement, central system 101 responds to an Internet access request by sending an enabling signal to the requesting device (such as Internet access device 112 in FIG. 1) and the requesting device responds to this enabling signal by enabling Internet access at the device for Internet access and perhaps other applications available at the Internet access device. Central system 101 may also send information on the user's Internet access time so that the requesting device may track the available time and perhaps display available Internet access time to the user. Some forms of the sweepstakes system may alternatively time the Internet access time only at the Internet access device such as 112 in FIG. 1, and may not independently time the access at central system 101.

If the incoming request is not recognizable as any of these requests, that is, an Internet time purchase request, a recharge request, a conversion request, a reveal request, a redeem request, or an Internet access request, the incoming request does not represent a valid request and central system 101 sends an error message to the requesting device. The central system 101 then waits for the next incoming request from a system component in the user system 102 shown in FIG. 1.

It will be appreciated that the various steps and processes shown in FIG. 11 are performed or controlled through various computer programs when central system 101 is implemented using general purpose data processing devices. For example, computer program code will be included for receiving an analyzing the various requests received from system components as indicated at process block 1102 in FIG. 11. Reveal request receiving program code may be included for receiving the reveal requests and entry selection program code may be included for selecting one or more sweepstakes entries for the reveal request. However, where the selection process is performed at a respective reveal station 114 (FIG. 1) rather than central system 101, the reveal station implemented using a general purpose data processing device would execute the reveal request receiving program code and the entry selection program code.

The invention encompasses numerous variations on the basic process shown in FIG. 11 for central system 101. One preferred implementation includes a separate login request as one of the potential requests received as indicated at process block 1102 in FIG. 11. In this implementation, central system 101 responds to the login request differently depending upon the device from which the login request is received. For example, for a login request at a recharge station such as recharge station 114 in FIG. 1, central system 101 may respond by acknowledging that the account specified in the login request is valid and by sending certain current account information back to the requesting device, such as the current Internet access time value associated with the account, the number of sweepstakes entries currently associated with the account for which results have not been revealed, and the total winnings that are available to be redeemed. A similar response from central system 101 would result from a login request from a POS 110 shown in FIG. 1. In this implementation, a login request from a reveal station such as reveal stations 114 in FIG. 1, may cause central system 101 to send back to the requesting reveal station an account acknowledgment signal, and all of the information that will be required by the reveal station to select sweepstakes entries to be revealed for a given reveal request initiated through the reveal station. This information may include a copy of the data tables associated with the user account such as a data table showing all entries that have been assigned to the user's account, or information derived from the data tables. In the former case, the reveal station would produce any required values from the user account information, such as coupon balance and cash balance as described above in connection with FIG. 8.

As indicated above, some preferred forms of the invention may allow a user to see their sweepstakes entry results through an Internet website. In these forms of the invention, central system 101 may implement an Internet server that is suitable for hosting the website. The website may be implemented such that a user may log in to the website from any Internet enabled computer or Internet appliance and enter either their account identifier. The website would then respond with a suitable presentation to reveal the sweepstakes entry results to the user. In some implementations of the sweepstakes system, the website would not provide a game presentation such as a reel-type presentation or card game type presentation. However, these types of presentations could be provided through a suitable result revealing website within the scope of the present invention. Whether casino-type or other entertaining game presentations are available through a result revealing website, the user preferably must still redeem their sweepstakes winnings at an appropriate system device such as POS 110 in FIG. 1.

It should further be noted that the user accounts used in the present sweepstakes distribution invention may vary greatly from one implementation to the next. In some forms of the invention, the user account with which sweepstakes entries are associated is a separate account from the account associated with the product or service being purchased which entitled the user to the sweepstakes entries. For example, an implementation of the form of the invention shown in the figures may utilize a user account with which to associate sweepstakes entries and a separate product account with which the Internet access time or other purchased products are associated. These two accounts are preferably linked in a suitable fashion, but remain separate accounts with separate account identifiers. However, other implementations of the system shown in the figures may use a single account both as a user account with which to associated sweepstakes entries and with which to associate the purchased Internet access time. These same account variations may be used in sweepstakes distribution systems according to the invention that are associated with other types of products.

The processes shown in FIG. 11 assume that a central system such as central system 101 shown in FIG. 1 maintains both Internet access time information and sweepstakes-related information for the user accounts, and thus provides support for all of the requests that may be entered from the various user devices included in the sweepstakes system. It will be appreciated, however, that information for Internet access time, and information related to the sweepstakes game may be maintained by different systems. In these cases it may be necessary for one or both of the separate systems to receive and respond to system component requests.

A sweepstakes entry distribution system embodying principles of the invention may include an alternative method of entry (AMOE) procedure that allows a person to obtain one or more sweepstakes entries without having to purchase a product. In one preferred arrangement, a person may send appropriate identifying information (name, mailing address, etc.) to a sweepstakes operator. The operator may then cause a user account card to be produced for the person and may make the user account card available to the requesting user. For example, the sweepstakes operator may mail the user account card back to the requesting person or may leave the user account card at some specified location to be picked up by the requesting user. In the case of the AMOE generated user account card, the user account card will not be associated with any product. However, the person acquiring the AMOE generated user account card may reveal the sweepstakes entry result or results associated with the user account in any of the ways described above for revealing results, and may redeem results in any of the ways described above.

The above-described arrangements for selecting sweepstakes entries to be revealed to a user are applicable to any sweepstakes game set regardless of how the sweepstakes game set is constructed. However, it has been found that it is possible to improve the performance of the various game presentations offered through the sweepstakes system if the sweepstakes game set has certain characteristics relative to the various game presentations that are used with the sweepstakes game set. The measure of "performance" here is the extent to which the prizes displayed in each game presentation, in the long run, match an "ideal prize distribution" for the respective game presentation. This "ideal prize distribution" for a given game presentation is defined by a number of prize levels, and, for each prize level, a frequency with which the prize at the respective level is ideally awarded according to the design of the game presentation. To improve this performance where a single sweepstakes game set is used to provide sweepstakes entries that may be revealed through a number of different game presentations, the sweepstakes game set is preferably designed so that the standard deviation associated with the prize distribution for the sweepstakes game set best matches the standard deviations associated with the given set of game presentations through which the sweepstakes entries may be revealed.

One preferred way to design a sweepstakes game set for a given group of game presentations is to perform a matching process between (1) a characteristic curve of standard deviation plotted against the number of sweepstakes entries to be revealed, and (2) data points defined by the respective ideal prize distribution for the various game presentations in the group. The above-described matching process for a given set of game presentations may include plotting data points defined by the standard deviation for various numbers of entries available in the game presentation. These data points are plotted on a graph with the number of entries on the horizontal axis and standard deviation on the vertical axis. This preferred matching process also includes varying the standard deviation of a target sweepstakes game set so that the curve of the standard deviation associated with the number of entries produces a desired match between the game presentation data points. The desired match may be obtained by a best fitting process, or may accommodate various prioritizations for certain game presentations. For example, a matching as described above may give priority to some of the game presentation data points so that the resulting match with the sweepstakes game set curve is not the mathematically best fit to the data points. This type of prioritization may, for example, give priority to certain entry levels (number of entries to be revealed for a given play) that are expected to be preferred by the users.

Once the desired match is produced as described above, the preferred standard deviation for the sweepstakes game set will be defined. The pay percentage for the sweepstakes game set, that is, the percentage of the payout in prizes of the total cost of entries expressed in some suitable fashion, will also be defined for the sweepstakes game set. It should be noted that the "cost" of entries in this sense is a fiction used to build the sweepstakes game set since the entries are in fact assigned to users for free in response to the purchase of Internet access time. In any event, any prize distribution for the sweepstakes game set that provides this preferred standard deviation and pay percentage may be used in preferred forms of the present invention, provided that the prize distribution includes a sufficient number of available prize levels to give the entry selection process being employed sufficient degrees of freedom to optimize its rate of success in the task of finding sweepstakes entries that will result in displaying the desired prize selected to be displayed (such as at block 803 in FIG. 8). For example, a sweepstakes game set may include one hundred and twenty (120) prize levels (including a zero value/losing prize level) in order to give the entry selection process or processes the desired flexibility in selecting entries to be revealed for a given reveal request.

The process of designing a sweepstakes game set for a given group of game presentations with different play characteristics may be modified to accommodate large jackpot prize values. Some of the pay for the sweepstakes game set may be reserved for paying large jackpot prizes that are awarded only infrequently in the various game presentations. It may be desirable in some cases to define a larger number of prize levels than are used for a given group of game presentations and reserve some prize levels for these large jackpot prizes that may be available periodically in a given group of game presentations.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the following claims. In particular, the various processing steps described above may be performed by any suitable processing device or devices included in the system.

The invention claimed is:

1. A game system including:

a first game of chance operable to provide a set of first game results, one or more of the first game results respectively associated with one or more awards in accordance with one or more first game characteristics;

a set of sweepstakes entries assigned to a player for the play of a sweepstakes game, each sweepstakes entry as assigned to the player being associated with a respective sweepstakes result, one or more of the sweepstakes results associated with one or more sweepstakes prizes in accordance with a sweepstakes prize distribution for the sweepstakes game; and one or more player stations operable by the player who has been assigned the set of sweepstakes entries, the one or more player stations being operable to play the first game of chance using one or more of the sweepstakes entries assigned to the player, and being operable to display one or more of the first game results, each displayed first game result correlating to the respective sweepstakes results associated with the one or more sweepstakes entries used to play the first game of chance.

2. The game system of claim 1, the game system including:

an assignment controller configured to assign the one or more sweepstakes entries to the player following an initiating event for the player.

3. The game system of claim 2, the initiating event comprising a purchase.

4. The game system of claim 2, the initiating event comprising a financial transaction.

5. The game system of claim 1, the sweepstakes entries assigned to the player being in a first order, the one or more player stations being operable to use the assigned sweepstakes entries in a second order different from the first order in order to substantially imitate one or more of the first game characteristics.

6. The game system of claim 1, the first game of chance comprising a reel-based game.

7. The game system of claim 1, the first game of chance comprising a playing card-based game.

8. The game system of claim 1, the one or more player stations each comprising a respective wireless device.

9. The game system of claim 1, the one or more player stations each comprising a respective computer.

10. The game system of claim 1, the one or more player stations operative to read a card and obtain information to provide game presentations corresponding to the assigned sweepstakes entries.

11. The game system of claim 10, the card comprising a credit card.

12. The game system of claim 10, the card comprising a gift card.

13. The game system of claim 10, the card comprising a player card assigned to the player and associated with a player account.

14. The game system of claim 10, the card comprising a smart card.

15. The game system of claim 10, further including a game server connected in a network with the one or more player stations.

16. A player station including:

a display device and a processor;

a first game of chance operable to provide a set of first game results, one or more of the first game results respectively associated with one or more awards in accordance with one or more first game characteristics; and set of sweepstakes entries which have been assigned to a player for the play of a sweepstakes game, each sweepstakes entry as assigned to the player being associated with a respective sweepstakes result, one or more of the sweepstakes results associated with one or more sweepstakes prizes in accordance with a sweepstakes prize distribution for the sweepstakes game;

the processor configured to play the first game of chance at the request of the player using one or more of the sweepstakes entries and to present one or more of the first game results on the display device in accordance with the first game characteristics, each displayed first game result correlating to the respective sweepstakes results associated with the one or more sweepstakes entries used to play the first game of chance.

17. The game system of claim 16, the set of sweepstakes entries have been assigned to the player in a first order, the processor operable to use the assigned sweepstakes entries in a second order different from the first order in order to substantially imitate one or more of the first game characteristics.

18. The game system of claim 16, wherein the player station includes a card reader operative to read a card and obtain information from the card to provide game presentations corresponding to the assigned sweepstakes entries.

19. A method including:

(a) receiving a reveal request at a player station, the reveal request being initiated by a user through a user input device of the player station;

(b) selecting a number of sweepstakes entries that have previously been assigned to a user account for the user, the selecting being performed by a data processing system, and each previously assigned sweepstakes entry being associated with a respective individual entry result at the time of the selection;

(c) with the data processing system, identifying a cumulative result for the selected number of sweepstakes entries, the cumulative result being equal to at least a portion of a total of the respective individual entry results for the selected number of sweepstakes entries; and (d) at a display device of the player station, revealing the cumulative result for the selected number of sweepstakes entries as a result responsive to the reveal request.

* * * * *

UNITED STATES PATENT AND TRADEMARK OFFICE

CERTIFICATE OF CORRECTION

PATENT NO. : 8,439,745 B2
APPLICATION NO. : 12/972487
DATED : May 14, 2013
INVENTOR(S) : Clifton E. Lind et al.

It is certified that error appears in the above-identified patent and that said Letters Patent is hereby corrected as shown below:

In the Claims:

In claim 16, at column 32, line 40, “set of sweepstakes” should read --a set of sweepstakes--.

Signed and Sealed this
Twentieth Day of August, 2013

Teresa Stanek Rea
*Acting Director of the United States Patent and Trademark Office*